United States Patent
Benson

(10) Patent No.: US 11,030,730 B2
(45) Date of Patent: Jun. 8, 2021

(54) COMPOSITE GROUP IMAGE

(71) Applicant: Shutterfly, LLC, Redwood City, CA (US)

(72) Inventor: Keith A. Benson, Eden Prairie, MN (US)

(73) Assignee: Shutterfly, LLC, Redwood City, CA (US)

( * ) Notice: Subject to any disclaimer, the term of this patent is extended or adjusted under 35 U.S.C. 154(b) by 80 days.

(21) Appl. No.: 16/373,425

(22) Filed: Apr. 2, 2019

(65) Prior Publication Data

US 2020/0320673 A1     Oct. 8, 2020

(51) Int. Cl.
```
G06T 5/50      (2006.01)
G06T 7/174     (2017.01)
G06T 7/13      (2017.01)
```
(52) U.S. Cl.
CPC .......... *G06T 5/50* (2013.01); *G06T 7/13* (2017.01); *G06T 7/174* (2017.01); *G06T 2207/20221* (2013.01)

(58) Field of Classification Search
None
See application file for complete search history.

(56) References Cited

U.S. PATENT DOCUMENTS

| | | | |
|---|---|---|---|
| 8,509,518 B2 * | 8/2013 | Sorek | G06T 11/60 |
| | | | 382/154 |
| 9,288,386 B2 | 3/2016 | Amagai et al. | |
| 9,953,220 B2 | 4/2018 | Agarwal et al. | |
| 10,120,549 B2 | 11/2018 | Jeong | |
| 2009/0022422 A1 * | 1/2009 | Sorek | G06T 3/4084 |
| | | | 382/284 |
| 2015/0009359 A1 | 1/2015 | Zaheer et al. | |
| 2015/0070523 A1 * | 3/2015 | Chao | H04N 5/23293 |
| | | | 348/218.1 |
| 2016/0093020 A1 | 3/2016 | Basalamah et al. | |

* cited by examiner

*Primary Examiner* — Leon Flores
(74) *Attorney, Agent, or Firm* — Merchant & Gould P.C.

(57) ABSTRACT

A method and device for generating a composite group image from subgroup images is provided. Subgroup images, each having a common background, are accessed. The boundaries of a subgroup area within each of the subgroup images is determined. At least one horizontal and at least one vertical shift factor is determined using the determined boundaries. An arrangement for the subgroup images based on the at least one horizontal and the at least one vertical shift factor is generated. The composite group image is generated by blending the subgroup images arranged in the arrangement.

20 Claims, 16 Drawing Sheets

COMPOSITE GROUP IMAGE

BACKGROUND

Photographing groups of people typically involves gathering all of the people together at a single time and place, and capturing photographs of the people while they are all gathered together. Various groups can be photographed in this manner. For example, a group may consist of a teacher and students of a grade school class, all of the members of a football team, the members of a church choir, or all of the employees of a small business, as several possible examples.

A first challenge can be arranging everyone's schedules so that they are physically present at the same time. Even if such a photo shoot can be scheduled, people often have to miss the scheduled date for one reason or another, such as an illness.

Even if the people can be gathered together simultaneously, another difficulty is arranging everyone with a proper pose and a good facial expression all at the same moment when the image is captured. Instead, someone will often be looking away, or will blink at that moment.

Another difficulty is that a lot of space is required in order to photograph a lot of people. This includes not only the physical space to contain the group, but also the space required for the camera, lights, and background. As one example, if there is a group of 20 people, photography might require an open space that is 15 to 30 feet across to arrange all of those people, and a similar distance deep so that the camera can get everyone within the camera's field of view. Further, it can be difficult to provide proper lighting for such a large group, and such lighting apparatus typically requires even more space above and to the sides of the group.

SUMMARY

In general terms, this disclosure is directed to a composite group image. In some embodiments, and by non-limiting example, the composite group image is generated from subgroup images.

One aspect is a method of generating a composite group image from subgroup images, the method comprising: accessing the subgroup images, each of the subgroup images having a common background; determining the boundaries of a subgroup area within each of the subgroup images; determining at least one horizontal and at least one vertical shift factor using the determined boundaries; generating an arrangement for the subgroup images based on the at least one horizontal and the at least one vertical shift factor; and generating the composite group image by blending the subgroup images arranged in the arrangement.

Another aspect is at least one computing device comprising: at least one processing device; and at least one computer readable storage medium storing data instructions that, when executed by the at least one processing device, cause the at least one processing device to: access the subgroup images, each of the subgroup images having a common background; determine the boundaries of a subgroup area within each of the subgroup images; determine at least one horizontal and at least one vertical shift factor using the determined boundaries; generate an arrangement for the subgroup images based on the at least one horizontal and the at least one vertical shift factor; and generate the composite group image by blending the subgroup images arranged in the arrangement.

A further aspect is at least one computer readable storage medium storing data instructions that, when executed by at least one processing device, cause the at least one processing device to: access the subgroup images, each of the subgroup images having a common background; determine the boundaries of a subgroup area within each of the subgroup images; determine at least one shift factor using the determined boundaries; generate an arrangement for the subgroup images based on the at least one horizontal shift factor; and generate the composite group image by blending the subgroup images arranged in the arrangement.

DETAILED DESCRIPTION

Figure 1:
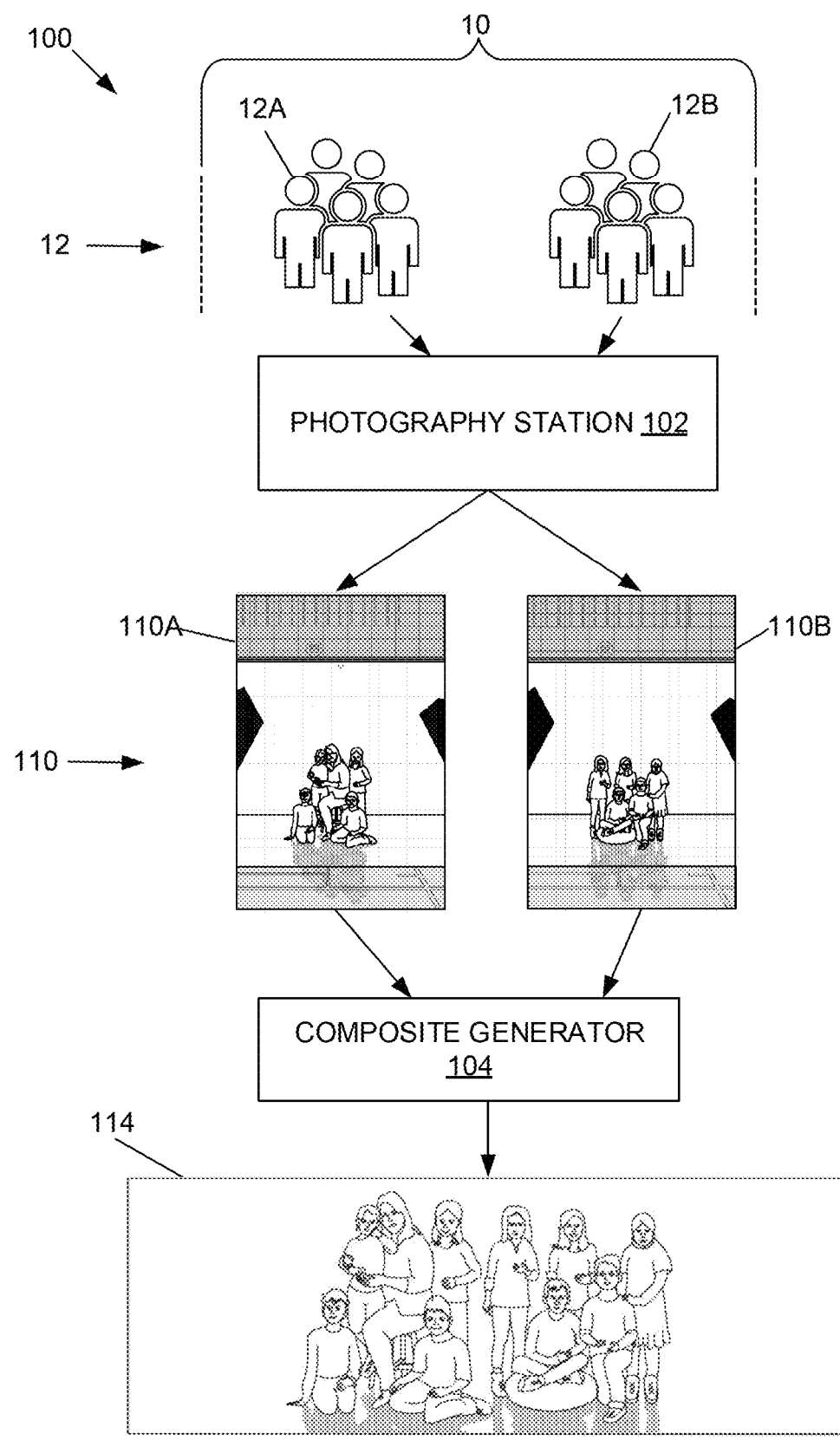
FIG. 1 is a schematic diagram illustrating an example of a system for generating a composite group image.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic diagram illustrating an example of a system 100 for generating a composite group image. In the illustrated example, the system 100 includes a photography station 102 and a composite generator 104. Also shown in FIG. 1 are a group 10 including subgroups 12 (including subgroups 12A and 12B), subgroup images 110 (including subgroup image 110A and subgroup image 110B), and a composite group image 114.

In this example, the system 100 includes the photography station 102 and the composite generator 104 for generating the composite group image 114. The system 100 can be used, for example, when it is difficult or undesirable to take a photograph of an entire group 10. In such cases, the entire group 10 may be divided into smaller subgroups 12, and the system 100 can then be used to generate a composite group image 114 of the entire group from a set of photographs taken of the subgroups 12, e.g. subgroup images 110.

The group 10 is the group for which a composite group image 114 is desired. The group 10 can be divided into subgroups 12, illustrated as subgroups 12A and 12B. For example, group the 10 may consist of a school class, subgroup 12A may consist of one or more members of the school class, and subgroup 12B may consist of one or more other members of the same school class. Although FIG. 1 shows only two subgroups 12, the composite group image 114 can be generated from more than two subgroups 12.

In some embodiments, the photography station 102 operates to capture a photograph of at least two of the subgroups 12, and generates subgroup images 110. Examples of the photography station 102 are illustrated and described in more detail herein with reference to FIGS. 2 and 3.

The subgroup images 110 are visual representations, in a digital format, of multiple subgroups 12 captured by a digital camera. In some embodiments, the individual subgroup images 110 each store a visual representation of only one subgroup. In some embodiments, the subgroup images 110 are encoded in a digital image file format. Examples of the subgroup images 110 are described in more detail herein with reference to FIG. 2.

The composite generator 104 generates the composite group image 114 using at least some of the subgroup images 110 and the subgroup data 112. The composite group image 114 depicts multiple of the subgroups 12 in a single image. In some embodiments, the composite group image 114 resembles a group photograph obtained by gathering the groups together as a group and photographing them all at the same time. In many embodiments, the composite generator 104 generates the composite group image 114 without using a template having predefined positions for the groups. Instead, the composite generator 104 determines appropriate positions for each group within the composite group image 114, such as based at least in part on layout rules, or other data or factors. In some embodiments, the composite generator 104 further processes the subgroup images 110 or the composite group image 114 to remove artifacts or for artistic effect. Examples of the composite generator 104 are described in more detail herein with reference to FIGS. 2 and 5.

The composite group image 114 is then stored in computer readable storage media. In some embodiments, the composite group image 114 is stored as an image file. In other embodiments, the composite group image 114 is stored as separate group image files, and shift factor data that defines the positions for each of the group images determined by the composite generator 104, so that an image file can be subsequently generated. One specific example of the composite group image 114 is illustrated and described in more detail with reference to FIG. 16.

Figure 2:
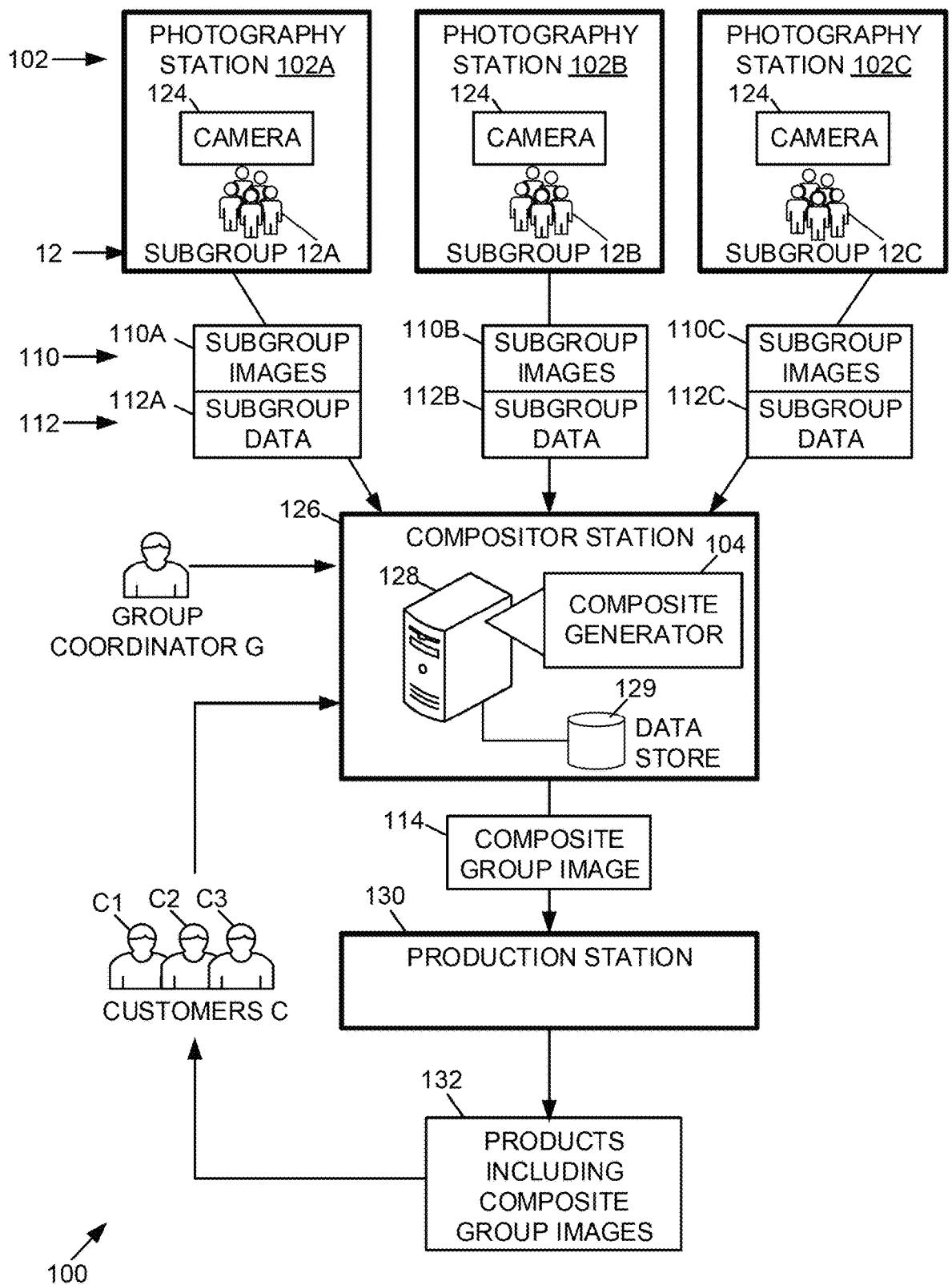
FIG. 2 is a schematic block diagram illustrating another example of a system for generating composite group images.

FIG. 2 is a schematic block diagram illustrating another example of a system 100 for generating composite group images. As previously described with reference to FIG. 1, the system 100 includes photography stations 102 and the composite generator 104. The example of the system 100 shown in FIG. 2 further includes a plurality of the photography stations 102A, 102B, and 102C, each having cameras 124; and a compositor station 126, including a computing device 128, the composite generator 104, and a data store 129. Also shown in FIG. 2 are subgroup images 110, subgroup data 112, the composite group image 114, a production station 130, products 132, subgroups 12 (including subgroups 12A, 12B, and 12C), a group coordinator G, and customers C (including customers C1, C2, and C3).

The photography stations 102 include at least one camera 124 that operates to capture a photograph of at least one of the subgroups. Cameras 124 can be film or digital cameras, and can be still or video cameras. If film cameras are used, the resulting prints are typically scanned by a scanner device into digital form. The resulting digital images are at least temporarily stored in computer readable storage medium as subgroup images 110, which are then transferred to the compositor station 126. The transfer can occur across a data communication network (such as the Internet, a local area network, a cellular telephone network, or other data communication network), or can occur by physically transferring the computer readable storage medium containing the subgroup images 110 (such as by personal delivery or mail) to the compositor station 126.

Each photography station 102 can be at a common location, or some or all of the photography stations 102 can be at different locations. For example, for a school photography session, each of the photography stations 102 can be setup in the school. As another example, however, the photography stations 102 can be setup in a retail store environment (such as a portrait studio), and the photography stations 102 can be in different cities, states, countries, continents, etc. In this example, the subgroups 12 (e.g., subgroups 12A-12C) can have their pictures taken at the closest or most convenient photography station 102 location, and the subgroups are not required to travel to a common location. For example, subgroup 12A has pictures taken at the photography station 102A, subgroup 12B has pictures taken at the photography station 102B, and subgroup 12C has pictures taken at the photography station 102C.

In some embodiments, the photography stations 102 are operated by a professional photographer. In other possible embodiments, the photography stations are automated. An example of an automated photography station 102 is a photo booth where the subject can interact directly with the photography station 102 to complete the photography session.

In other possible embodiments, the photography station can include additional hardware, such as lighting systems, control systems, or other physical objects or devices. One specific example of a photography station 102 is illustrated and described in more detail herein with reference to FIG. 3.

In the example shown, the photography station 102 generates subgroup images 110 in a digital format, such as the joint photographic experts group (JPEG) digital image format. Other embodiments use other formats, such as exchangeable image file format (EXIF), tagged image file format (TIFF), raw image format (RAW), portable network graphics (PNG) format, graphics interchange format (GIF), bitmap file format (BMP), portable bitmap (PBM) format, or other digital file formats. In some embodiments, subgroup images 110 are stored as individual image files, each having a file name. In some embodiments, the file name can be used to uniquely identify the subgroup image 110. In some embodiments, subgroup images 110 include metadata. The metadata can store data, such as an identifier, that is used to link the subgroup image 110 with the associated data in the subgroup data 112 for that subgroup image 110. An example of an identifier is a subgroup identification number. Another example of an identifier is a name of the subgroup.

In some embodiments, there may be multiple subgroup images 110 available for a single subgroup. For example, a subgroup image 110A can have two subgroup images 110A-1 and 110A-2 (not separately depicted in FIG. 2). A second subgroup image 110B can also have two subgroup images 110B-1 and 110B-2. Additional subgroups can similarly have one or more respective subgroup images (110A-3, 110B-3, 110A-4, 110B-4, etc.). More or fewer subgroup images 110 can be provided for a given subgroup, and some subgroups can have more subgroup images 110 than other subgroups. The multiple subgroup images 110 for a subgroup typically include different visual representations of the subgroup, such as depicting the subgroup in different poses.

In some embodiments, subgroup data 112 is generated, which contains information relating to the subgroups 12 in a subgroup image 110. The subgroup data 112 contains data relating to the subgroups 12 depicted in the subgroup images 110. For example, the subgroup data 112 can identify the subgroup's name, or the names of the members comprising the subgroup, identification numbers (school IDs of subgroup members, employee IDs of subgroup members, driver's license numbers, social security numbers, etc.), the subgroups' 12 affiliations (a school, a class, a team, a club, a business unit, a department, etc.), physical characteristic data (subgroup members' heights, weights, clothing color, skin color, hair color, hair height, etc.), body position data (coordinates of body parts such as joints, hands, feet, head, facial features, etc.), pose data (e.g., an identification of the subgroup members' pose, or a pose of the subgroup as a whole, in one or more subgroup images 110, such as the direction the subgroup is facing, whether subgroup members are standing, kneeling, sitting, or laying down, whether subgroup members' arms are straight, bent, or crossed, whether subgroup members are holding a prop), the subgroups' 12 status within the larger group 10, or any other desired information about or related to the subgroup members in the subgroup images 110. Subgroup data 112 can include more, less, or different information, as desired.

In one example, a possible way to collect subgroup data 112 is by using a data card that is given to the members of the subgroups at or before the photography session. The data card can include a computer readable code, such as a barcode, which can be read by a scanner to provide the information to a computing device at the photography station 102. Examples are described in U.S. Pat. No. 7,714,918, issued on May 11, 2010, titled Identifying and Tracking Digital Images With Customized Metadata. In some embodiments, subgroup data 112 is provided by the subgroup, someone associated with the subgroup (such as a parent, colleague, or the group coordinator G). Some or all of the subgroup data 112 can be stored within metadata of the subgroup images 110, or separate from the subgroup images 110, such as in a subgroup data file. The subgroup images 110 and subgroup data 112 are associated with each other, so that the subgroup data 112A for subgroup 12A is associated with the subgroup images 110A for the same subgroup, and so on for all subgroups.

In another possible embodiment, some or all of the subgroup data 112 can be provided directly to the compositor station 126, rather than (or in addition to) the photography station 102. For example, the subgroups 12A-C and/or a group coordinator G (or other persons) can provide some or all of the subgroup data 112 to the compositor station 126 before or after the subgroup images 110 are captured. As one example, a school employee acts as the group coordinator G for the students of the school. The school employee provides subgroup data 112 including the names, identification numbers, and subgroup affiliation data. The subgroup affiliation data identifies the students in each grade (Kindergarten, first, second, third, etc.), the students in a club (the baseball team, the debate club, the yearbook committee, etc.), or any other subgroup affiliations.

The compositor station 126 typically includes one or more computing devices 128. An example of the computing device 128 is illustrated and described herein with reference to FIG. 4. The computing device 128 typically includes at least a processing device and one or more computer readable storage media.

The composite generator 104 is executed by one or more computing devices 128 in some embodiments. In some embodiments, the composite generator 104 is stored in computer readable storage media and includes instructions that are executable by the processing device to perform the operations of the composite generator 104. An example of the composite generator 104 is illustrated and described in more detail with reference to FIG. 5.

The data store 129 is provided to store data used by and generated by the composite generator 104, such as the subgroup images 110 and subgroup data 112 received by the compositor station 126. The data store 129 typically includes one or more computer readable storage media that operate to store digital data. The data store 129 can be part of the computing device 128 or separate from but in data communication with the computing device 128. An example of the data store 129 is also illustrated and described in more detail herein with reference to FIG. 5.

The composite generator 104 generates the composite group image 114 from the subgroup images 110, as shown in FIG. 1. Additional details regarding exemplary embodiments of the composite generator 104 are illustrated and described in more detail herein with reference to FIGS. 6-14

In some embodiments, the composite group image 114 is provided to a production station 130, which generates products 132 from or including the composite group image 114. In some embodiments, the production station 130 includes a printer that generates a print of the composite group image 114 on photographic paper. The print can be the final product, or the print can be part of the product, such as a yearbook, scrapbook, business publication, calendar, keychain, and the like. In some embodiments, the composite group image 114 is applied to an object, such as a t-shirt or a coffee mug.

The production station 130 includes a computing device. For example, in some embodiments the production station 130 uses the computing device to save the composite group image 114 on a computer readable storage medium, such as a CD, DVD, or a memory card or stick. In another possible embodiment, the production station 130 includes a web server computing device, which is in data communication with a data communication network, such as the Internet. The web server can distribute a digital product including the composite group image 114 across the data communication network, such as through a web page, in an e-mail message, through a text message, or by other data communication techniques.

The products 132 are ultimately delivered to customers C by personal delivery, mail, or electronic data communication, as several examples. The products can be first delivered to an intermediary, such as the group coordinator G, who then distributes the products 132 to the appropriate customer (e.g., C1, C2, or C3).

Figure 3:
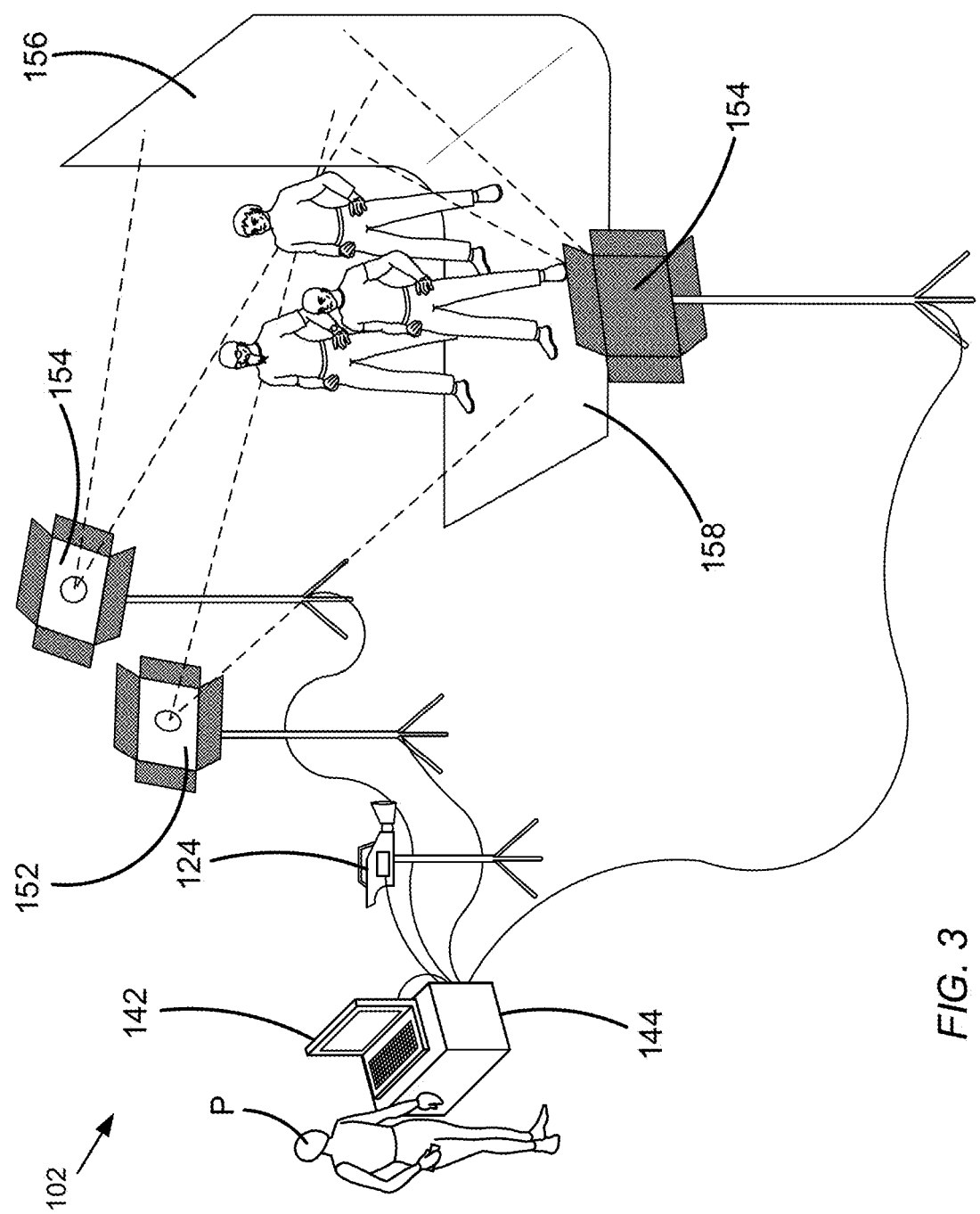
FIG. 3 is a schematic block diagram of an example of a photography station.

FIG. 3 is a schematic block diagram of an example of a photography station 102. In the example shown, the photography station 102 includes a digital camera 124, a computing device 142, a controller 144, foreground lights 152, background lights 154, a background 156, and a sweep area 158. In some embodiments, the photography station 102 further includes a handheld control (not shown) for use by a photographer P. The handheld control can include a capture button, for example, that is pressed by the photographer P to initiate the capture of an image with the digital camera 124, and in some cases, the capture of an image is coordinated with flash lighting.

The photography station 102 operates to capture one or more photographs of one or more subgroups 12 (e.g., subgroup 12A), and can also operate to collect additional information about the subgroup, such as body position data. In some embodiments, the photography station 102 is controlled by a photographer P, who interacts with the subgroups 12 to guide the subgroups 12 to a good expression, and indicates to the photography station 102 when an image should be captured.

The digital camera 124 operates to capture digital images of the subgroups 12. The digital camera 124 is typically a professional quality digital camera that captures high quality photographs.

In some embodiments, data from the digital camera 124 is supplied to a computing device 142. An example of a computing device is illustrated and described in more detail with reference to FIG. 4.

The computing device 142 can be directly or indirectly connected to the digital camera 124 to receive digital data. Direct connections include wired connections through one or more communication cables, and wireless communication using wireless communication devices (e.g., radio, infrared, etc.). Indirect connections include communication through one or more intermediary devices, such as a controller 144, other communication devices, other computing devices, a data communication network, and the like. Indirect connections include any communication link in which data can be communicated from one device to another device.

Some embodiments further include a controller 144. The controller 144 operates, for example, to synchronize operation of the digital camera 124 with the foreground lights 152 and the background lights 154. Synchronization can alternatively be performed by the computing device 142 in some embodiments.

Some embodiments further include a data input device, such as a barcode scanner, which can be integrated with the handheld control, or a separate device. The barcode scanner can be used to input data into the photography station 102. For example, members of a subgroup 12 can be provided with a card containing a barcode. The barcode is scanned by the data input device to retrieve barcode data. The barcode data includes, or is associated with, subgroup data 112 that identifies the subgroup 12, or members of the subgroup 12. The barcode data can also include or be associated with additional data, such as order data (e.g., a purchase order for products made from the images), group affiliation data (e.g., identifying the group 10, or subgroups 12, or group members as being affiliated with a school, church, business, club, sports team, etc.), or other helpful information. The computing device 142 can alternatively, or additionally, operate as the data input device in some embodiments.

In the example shown, the photography station 102 includes background lights 154. In some embodiments, a single background light 154 is included. The background lights can include one or more light sources, such as incandescent bulbs, fluorescent lamps, light-emitting diodes, discharge lamps, and the like. The background lights 154 are arranged and configured to illuminate the background 156. In some embodiments the background lights 154 are arranged at least partially forward of the background 156, to illuminate a forward facing surface of the background 156. In other embodiments, the background lights 154 are arranged at least partially behind the background, to illuminate a translucent background 156 from behind.

In some embodiments, the photography station 102 includes foreground lights 152. In some embodiments, a single foreground light 152 is included. The foreground lights 152 can include one or more light sources, such as incandescent bulbs, fluorescent lamps, light-emitting diodes, discharge lamps, and the like. The foreground lights 152 can include multiple lights, such as a main light and a fill light. Each of these lights can include one or more light sources.

The foreground lights 152 are arranged at least partially forward of a subgroup 12, such as subgroup 12A, to illuminate the subgroup 12A while an image is being taken. Because a background 156 is typically positioned behind the subgroups 12, the foreground lights 152 can also illuminate the background 156.

The photography station 102 can include a background 156. The background 156 is typically a sheet of one or more materials that is arranged behind a subgroup 12, such as subgroup 12A, while an image of the subgroup 12A is captured. In some embodiments the background 156 is translucent, such that at least some of the light from the background light 154 is allowed to pass through. Typically, the background 156 has a monochromatic color. In a preferred embodiment, the background 156 has a color, such as gray or white, which does not substantially add color to the subgroup 12 in a digital image. In some embodiments, the background 156 is smooth, such that it has no visible pattern or fabric texture. An example of a suitable material is a rear projection screen material. Other embodiments illuminate the background 156 from the front (but behind the subgroup 12), such that background 156 need not be translucent. An example of a suitable material for the background 156, when front illumination is used, is a front projection screen material. In preferred embodiments, the same background 156 is used for all of the subgroup images 110, and is therefore common to the set of subgroup images 110 from which a composite group image 114 is generated.

The sweep area 158 is typically a sheet of one or more materials that can be arranged underneath the subgroup 12, while an image of the subgroup 12 is captured. In some embodiments, the materials of the background 156 and the sweep area 158 are the same and are one contiguous sheet that folds, bends, or drapes to form the background 156 and the sweep area 158. In other embodiments, the background 156 and the sweep area 158 are made from the same or different materials, and are separate sheets. In some embodiments, the background 156 overlaps with the sweep area 158 such that there is no gap where the two join.

FIGS. 4-14 describe exemplary aspects of the compositor station 126, shown in FIG. 2.

Figure 4:
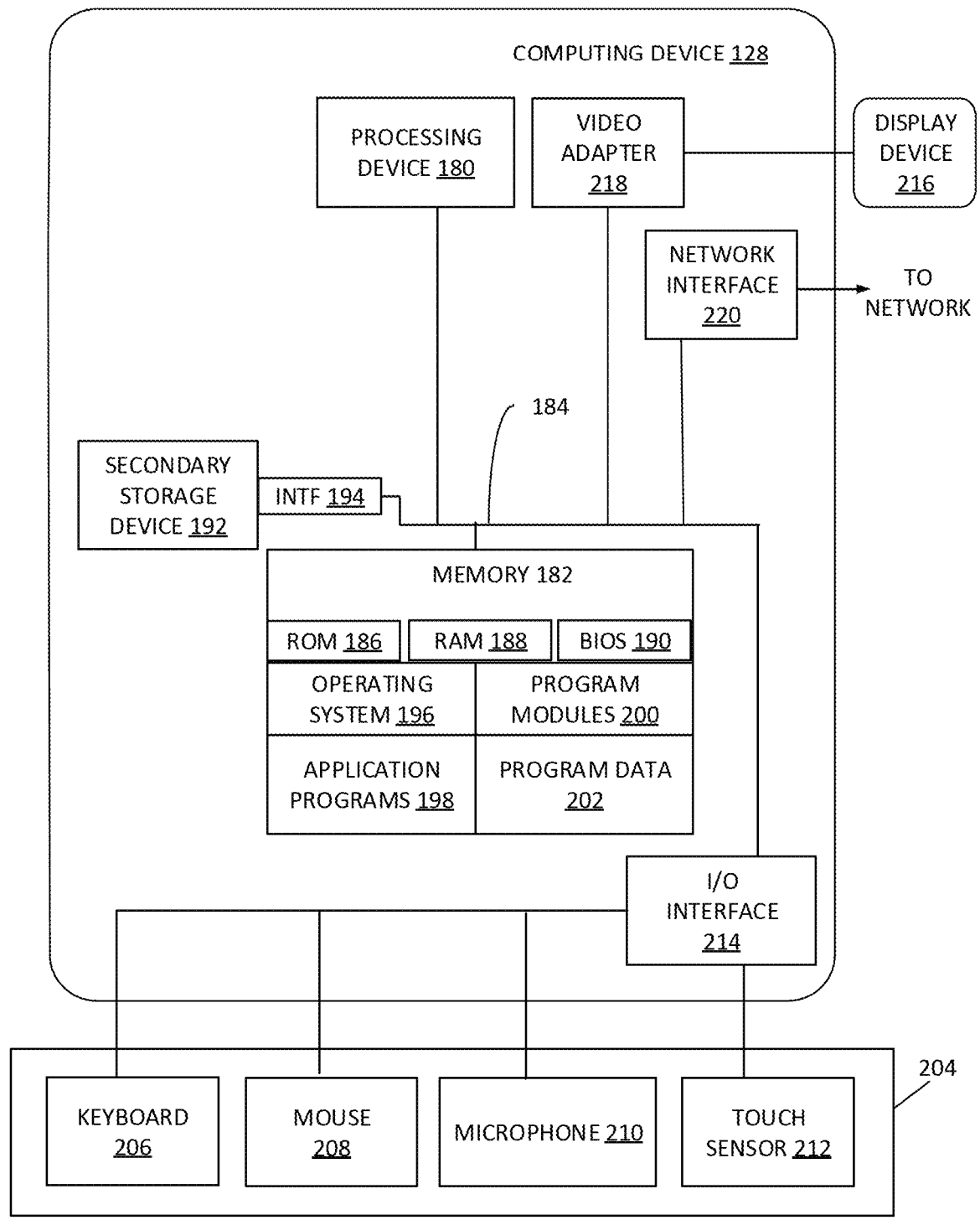
FIG. 4 illustrates an exemplary architecture of a computing device that can be used to implement aspects of the present disclosure, including any of the plurality of computing devices described herein.

FIG. 4 illustrates an exemplary architecture of a computing device that can be used to implement aspects of the present disclosure, including any of the plurality of computing devices described herein. The computing device illustrated in FIG. 4 can be used to execute the operating system, application programs, and software described herein. By way of example, the computing device will be described below as the computing device 128 of the compositor station 126, shown in FIG. 2. To avoid undue repetition, this description of the computing device will not be separately repeated herein for each of the other computing devices, including the computing device 142, but such devices can also be configured as illustrated and described with reference to FIG. 4.

The computing device 128 includes, in some embodiments, at least one processing device 180, such as a central processing unit (CPU). A variety of processing devices are available from a variety of manufacturers, for example, Intel or Advanced Micro Devices. In this example, the computing device 128 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

Examples of computing devices suitable for the computing device 128 include a desktop computer, a laptop computer, a tablet computer, a mobile computing device (such as a smart phone, an iPod® or iPad® mobile digital device, or other mobile devices), or other devices configured to process digital instructions.

The system memory 182 includes read only memory 186 and random access memory 188. A basic input/output system 190 containing the basic routines that act to transfer information within computing device 128, such as during start up, is typically stored in the read only memory 186.

The computing device 128 also includes a secondary storage device 192 in some embodiments, such as a hard disk drive, for storing digital data. The secondary storage device 192 is connected to the system bus 184 by a secondary storage interface 194. The secondary storage devices 192 and their associated computer readable media provide nonvolatile storage of computer readable instructions (including application programs and program modules), data structures, and other data for the computing device 128.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 192 or memory 182, including an operating system 196, one or more application programs 198, other program modules 200 (such as the software described herein), and program data 202. The computing device 128 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides inputs to the computing device 128 through one or more input devices 204. Examples of input devices 204 include a keyboard 206, mouse 208, microphone 210, and touch sensor 212 (such as a touchpad or touch sensitive display). Other embodiments include other input devices 204. The input devices are often connected to the processing device 180 through an input/output interface 214 that is coupled to the system bus 184. These input devices 204 can be connected by any number of input/output interfaces, such as a parallel port, serial port, game port, or a universal serial bus. Wireless communication between input devices and the interface 214 is possible as well, and includes infrared, BLUETOOTH® wireless technology, 802.11a/b/g/n, cellular, or other radio frequency communication systems in some possible embodiments.

In this example embodiment, a display device 216, such as a monitor, liquid crystal display device, projector, or touch sensitive display device, is also connected to the system bus 184 via an interface, such as a video adapter 218. In addition to the display device 216, the computing device 128 can include various other peripheral devices (not shown), such as speakers or a printer.

When used in a local area networking environment or a wide area networking environment (such as the Internet), the computing device 128 is typically connected to the network through a network interface 220, such as an Ethernet interface. Other possible embodiments use other communication devices. For example, some embodiments of the computing device 128 include a modem for communicating across the network.

The computing device 128 typically includes at least some form of computer readable media. Computer readable media includes any available media that can be accessed by the computing device 128. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 128.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 4 is also an example of programmable electronics, which can include one or more such computing devices, and when multiple computing devices are included, such computing devices can be coupled together with a suitable data communication network so as to collectively perform the various functions, methods, or operations disclosed herein.

Figure 5:
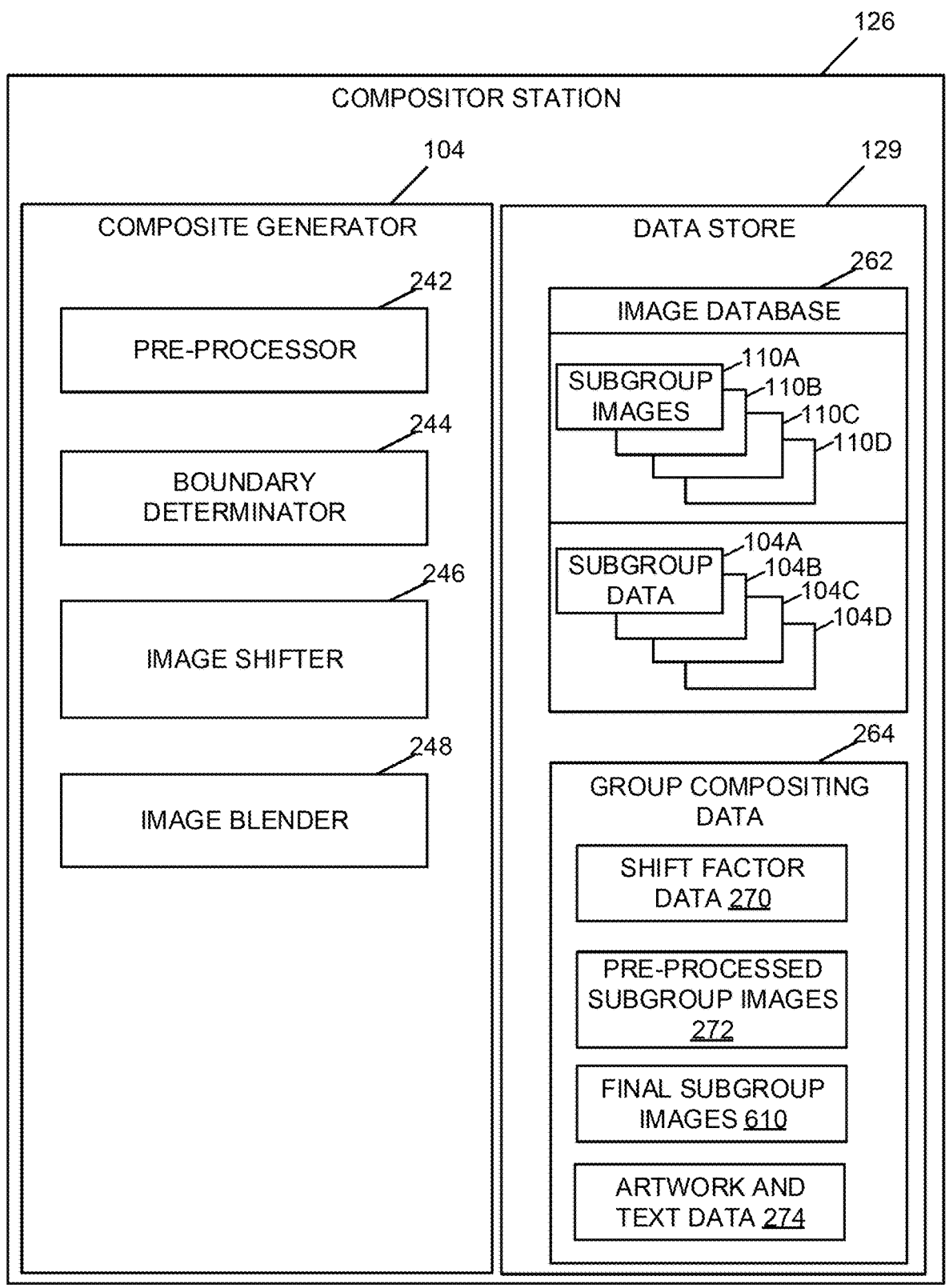
FIG. 5 is a schematic block diagram illustrating an example of the compositor station.

FIG. 5 is a schematic block diagram illustrating an example of the compositor station 126 (shown in FIG. 2). In this example, the compositor station 126 includes the compositor generator 104 and the data store 129. This example of the composite generator 104 includes a pre-processor 242, a boundary determinator 244, an image shifter 246, and an image blender 248. This example of the data store 129 includes an image database 262 (including subgroup images 110 and subgroup data 112), and group compositing data 264 (including shift factor data 270, pre-processed subgroup images 272, and artwork and text data 274.

Each of the components of the exemplary compositor station 126 will be briefly discussed below, followed by more detailed examples that are described with reference to FIGS. 6-14.

The pre-processor 242 is provided in some embodiments to perform some initial processing operations on the subgroup images 110 received from the photography station 102. The pre-processing can include, for example, loading the subgroup images 110, rotating the subgroup images 110 such that the groups within the images are upright, normalizing the brightness levels of each of the subgroup images 110, and color profile adjustments. The resulting group images are then stored as pre-processed subgroup images 272, such as shown in FIG. 5. An example of the operations that can be performed by the pre-processor 242 are described in FIG. 7

The boundary determinator 244 operates to determine boundaries for the subgroups 12 within the pre-processed subgroup images 272 from the image database 262. Boundary determination can include determining top and bottom crop heights for the set of pre-processed subgroup images 272 from the image database 262, generating grayscale subgroup images from the pre-processed subgroup images 272, generating blurred grayscale subgroup images, comparing the grayscale subgroup images to the blurred grayscale subgroup images, determining the edges of the subgroups within the pre-processed subgroup images 272 based on the comparison of the grayscale subgroup images to the blurred grayscale subgroup images, and flooding the top and sides of the pre-processed subgroup images 272 outside of the boundaries, e.g. flooding all of common background area of each of the pre-processed subgroup images 272 outside of the determined boundaries except for the sweep area underneath the subgroups. An example of the operations that can be performed by the boundary determinator 244 are described in more detail in FIGS. 8-10.

The image shifter 246 operates to determine shift factor data 270 based on the determined boundaries of the pre-processed subgroup images 272 that result in an arrangement of final subgroup images 610 that satisfy an aesthetic criterion. Image shifting can include determining a threshold, or predetermined, minimum horizontal boundary separation distance, comparing the boundary locations of each of the horizontal rows of the final subgroup images 610 for each of a range of vertical alignments of the final subgroup images 610, determining horizontal and vertical shift factors to arrange the final subgroup images 610 so as to satisfy an aesthetic criterion, and arranging the final subgroup images 610 based on the shift factors. An example of the operations that can be performed by the image shifter 246 are described in more detail in FIGS. 11-14.

The image blender 248 operates to composite the final subgroup images 610 into the composite group image 114 based on the arrangement of the final subgroup images 610 determined by the image shifter 246. In some embodiments, two or more of the final subgroup images 610 will at least partially overlap. Image blending can include determining weights for each of the channels of the arranged final subgroup images 610, determining each of the channels of the composite group image 114 based on a weighted sum of the overlapping pixels of the arranged final subgroup images 610 using the determined weights, and sizing the composite group image 114 by adding whitespace to the horizontal or vertical edges of the composite group image 114, or cropping the composite group image 114 horizontally or vertically, to arrive at a desired aspect ratio, e.g. 4×6, 5×7, 8×10, 3.5×9.5, 9×16, etc. An example of the operations that can be performed by the image blender 248 are described in more detail in FIGS. 13-14.

Group compositing data 264 stores data that is used by the composite generator 104. In this example, the group compositing data 264 includes shift factor data 270, pre-processed subgroup images 272, and artwork and text data 274.

The shift factor data 270 contains data that identifies the shift factors for arranging the final subgroup images 610 in order to blend the final subgroup images 610 to generate the composite group image 114. The shift factor data 270 can include both horizontal shift factors and vertical shift factors.

The pre-processed subgroup images 272 are the subgroup images 110 after pre-processing has been completed. For example, the pre-processed subgroup images 272 can include loading, rotating, brightness normalizing, and color profile adjustments made to the subgroup images 110 that are originally received from the photography stations 102.

The final subgroup images 610 are the pre-processed subgroup images 272 after subgroup area boundaries 520 have been determined. For example, the final subgroup images 610 can include brightening and cropping the pre-processed subgroup image 272, determining the subgroup area boundaries 520 based on further processing of the pre-processed subgroup images 272, and flooding non-shadow areas of the backgrounds outside of the determined subgroup area boundaries 520.

Additional artwork and text can be included in the composite group image 114, and such artwork or text is stored in the artwork and text data 274 in some embodiments. The artwork can include a background art image to be used as the final background of the composite group image 114, for example. The artwork can also include logos, graphics, icons, and the like to be included in the composite group image 114. Text, such as a name of the group, a year, names of the subjects, etc. can also be included in the composite group image 114 if desired.

Figure 6:
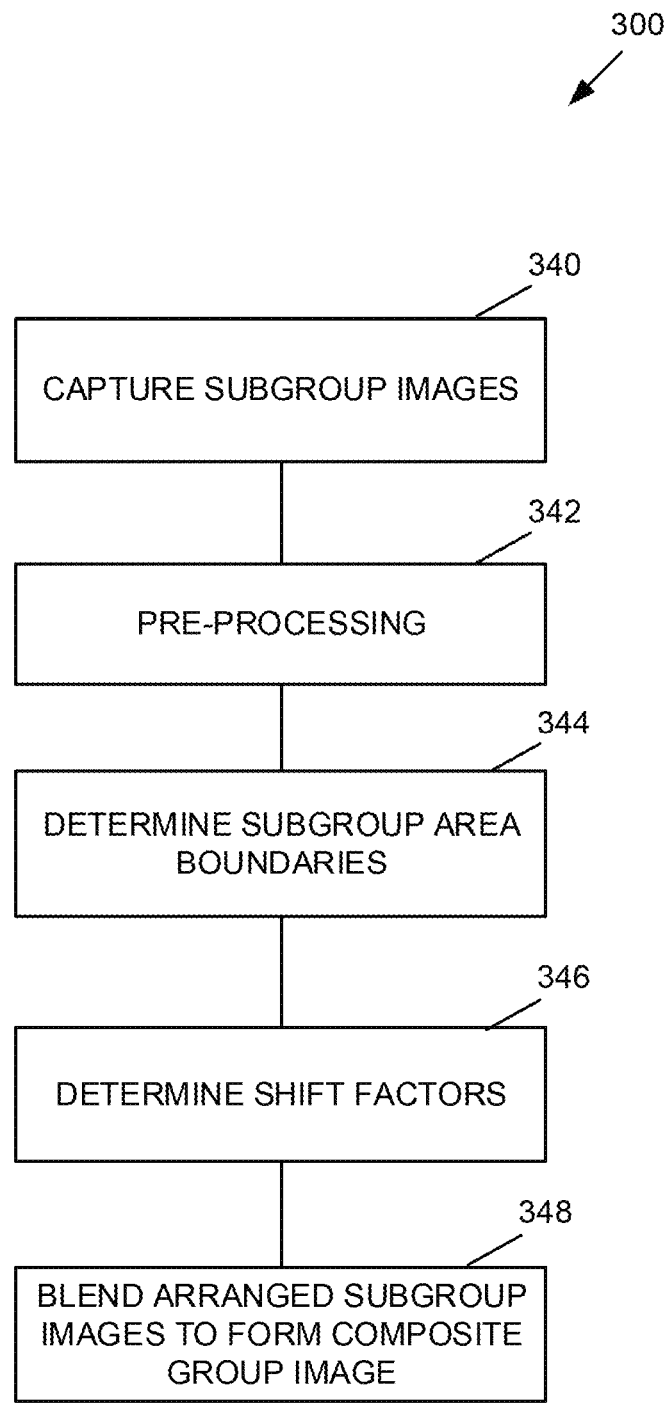
FIG. 6 is a flow chart illustrating an example method for generating a composite group image.

FIG. 6 is a flow chart illustrating an example method 300 for generating a composite group image 114. In this example, the method 300 includes operations 340, 342, 344, 346, and 348.

The operation 340 captures subgroup images, such as subgroup images 110. Capturing subgroup images can be done with a photography station, such as the photography station 102. The subgroup images 110 are typically captured using a digital camera, and are encoded in a digital image file format, such as the example file formats described herein.

In some embodiments, the subgroup images 110 can be captured using the same photography station 102. In some embodiments, the subgroup images 110 can be captured using a common background, for example, by using the same background 156 and sweep area 158 when capturing the subgroup images 110. In some embodiments, a common background, as between captured subgroup images 110, can have the same, or substantially similar, photographic characteristics, e.g. brightness, color, texture and the like, either in reflection or transmission. In other embodiments, a common background, as between captured subgroup images 110, can consist of different physical backgrounds 156 and sweep areas 158 at the same or different photography stations 102 while having the same or substantially similar photographic characteristics. In some embodiments, a common background can be a single color, e.g. white, without texture, e.g. negligible spatial variation in brightness or color.

The operation 342 performs pre-processing on the captured subgroup images 110. Pre-processing includes loading the subgroup images 110 into computer memory for digital manipulation, rotating the subgroup images 110, determining characteristics of the group images such as the brightest line area on the background above the group, and brightening the subgroup images 110. The pre-processing operation 342 can also including saving the subgroup images 110 after pre-processing as pre-processed subgroup images 272. The pre-processing operation 342 is described in more detail herein with reference to FIG. 7 below, and in at least some embodiments is performed by a pre-processor, such as the pre-processor 242.

The operation 344 determines boundaries of the subgroup area within the pre-processed subgroup images 272. Determining subgroup area boundaries can include determining a top crop height for the pre-processed subgroup images 272 and cropping the pre-processed subgroup images 272 at the determined top crop height, generating grayscale duplicates of pre-processed subgroup images 272, blurring the grayscale duplicates to generate a blurred version of the grayscale duplicates, comparing the grayscale duplicates with the blurred grayscale duplicates, determining the edges of the subgroup area based on the comparison, determining a bottom crop height and cropping the pre-processed subgroup images 272 at the determined bottom crop height, and flooding the top and sides of the background area of the pre-processed subgroup images 272 to maximum brightness, e.g. the non-sweep areas of the pre-processed subgroup images 272, to generate final subgroup images 610. The operation 344 is described in more detail herein with reference to FIGS. 8-10, and in at least some embodiments is performed by a boundary determinator, such as the boundary determinator 244.

The operation 346 determines shift factors for arranging the final subgroup images 610 in order to generate the composite group image 114. Determining shift factors includes determining a threshold, or predetermined, minimum horizontal boundary separation distance, comparing the boundary locations of each of the horizontal rows of the final subgroup images 610 for each of a range of vertical alignments of the final subgroup images 610, determining shift factors for shifting the final subgroup images 610 relative to each other to arrive at an arrangement of the final subgroup images 610 that satisfies an aesthetic criterion, and arranging the final subgroup images 610 based on the determined shift factors. The operation 346 is described in more detail herein with reference to FIGS. 11-14 below, and in at least some embodiments is performed by an image shifter, such as the image shifter 246.

The operation 348 blends the arranged final subgroup images 610 after the final subgroup images 610 have been arranged in operation 346. Blending the arranged group images includes generating weights based on grayscale duplicates of the final subgroup images 610, and generating the composite group image 114 based on a weighted sum of the final subgroup images 610, the final subgroup images 610 having been arranged based on horizontal shift factors. The operation 348 is described in more detail herein with reference to FIGS. 13-14 below, and in at least some embodiments is performed by an image blender, such as the image blender 248.

Figure 7:
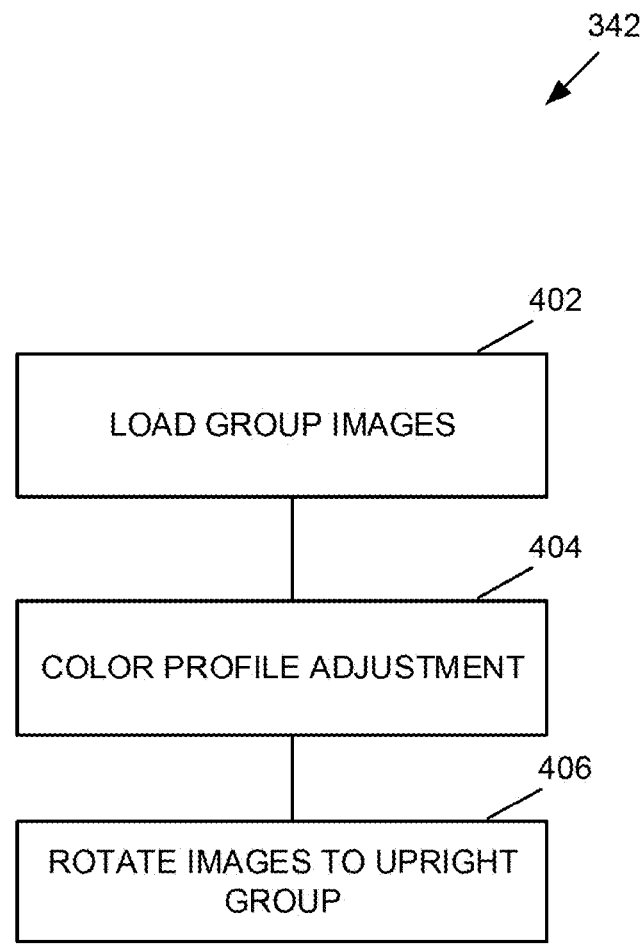
FIG. 7 is a flow chart illustrating an example method of pre-processing subgroup images for generating a composite group image.

FIG. 7 is a flow chart illustrating an example method 342 of pre-processing subgroup images 110 for generating a composite group image 114. In this example, the method 342 includes operations 402, 404, and 406.

The operation 402 loads subgroup images 110. As described above, subgroup images 110 can be captured by a photography station 102 and stored as digital images in computer readable storage medium, such as a memory 182 on a computing device 128, a secondary storage device 192, or a data store 129. If the subgroup images 110 are not already stored in the data store 129 in the compositor station 126 for use by the composite generator 104, the subgroup images 110 are loaded into the data store 129.

The operation 404 performs a color profile adjustment on the subgroup images 110. Because the subgroup images 110 can be captured from multiple different photography stations 102, and can be captured with different cameras 124, the subgroup images 110 can have different formats. A color profile adjustment operates to transform each of the subgroup images 110 from the native color space(s) into a common color space to be used by the composite generator 104. As one example, the subgroup images 110 are converted into the sRGB (standard red-green-blue) color space. In some embodiments, the operation 404 is optional.

The operation 406 rotates the subgroup images 110 to a common orientation. Because the subgroup images 110 can be captured from multiple different photography stations 102, and can be captured with different cameras 124, and because the camera 124 at any of the photography stations 102 can be mounted in any rotational orientation, e.g. landscape, portrait, at 45 degrees between landscape and portrait, etc., the subgroup images 110 can have different orientations. A rotation operates to orient each of the subgroup images 110 the same, and to ensure that the entire group 10 in the final composite group image 114 is upright. In some embodiments, the operation 406 is optional.

Following operation 406, the subgroup images 110 can be stored in memory, for example as pre-processed subgroup images 272 in the data store 129.

Each of the components of the exemplary compositor station 126 will be briefly discussed below, followed by more detailed examples that are described with reference to FIGS. 6-14.

Figure 8:
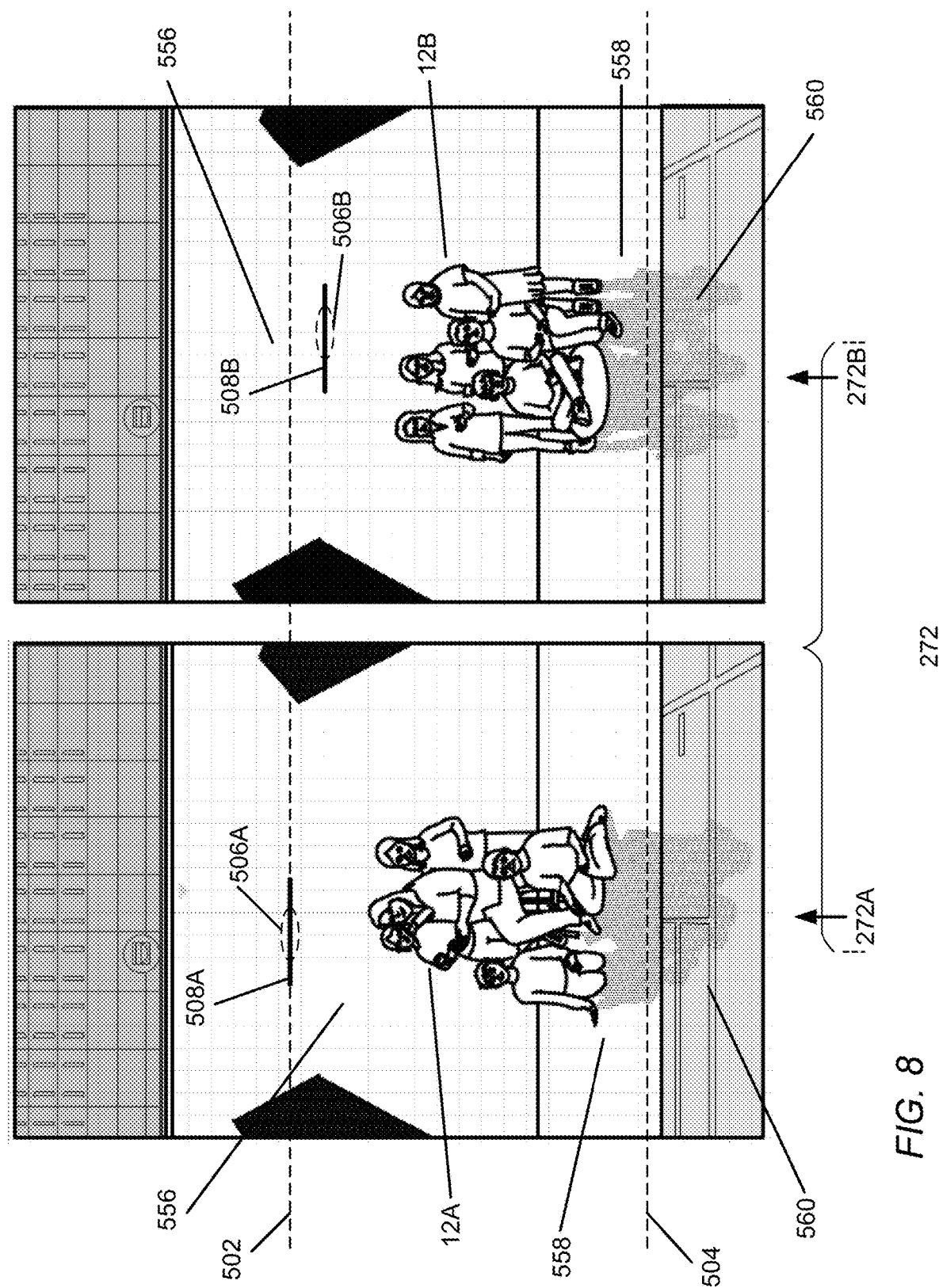
FIG. 8 illustrates an example of pre-processed subgroup images in relation to determining the top crop height for cropping pre-processed subgroup images.
Figure 9:
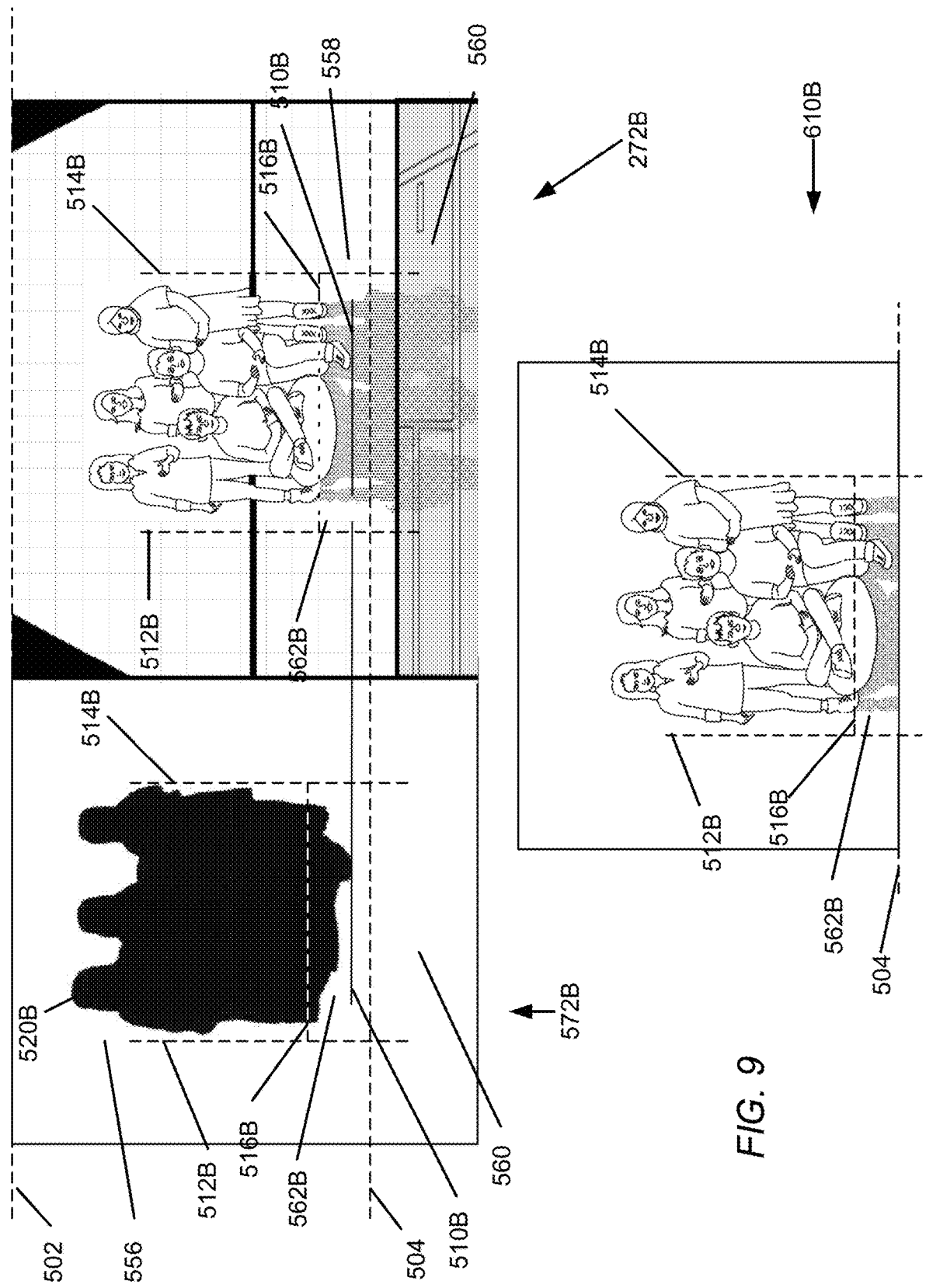
FIG. 9 illustrates an example of pre-processed subgroup images at various stages of determining subgroup area boundaries and determining the bottom crop height.
Figure 10:
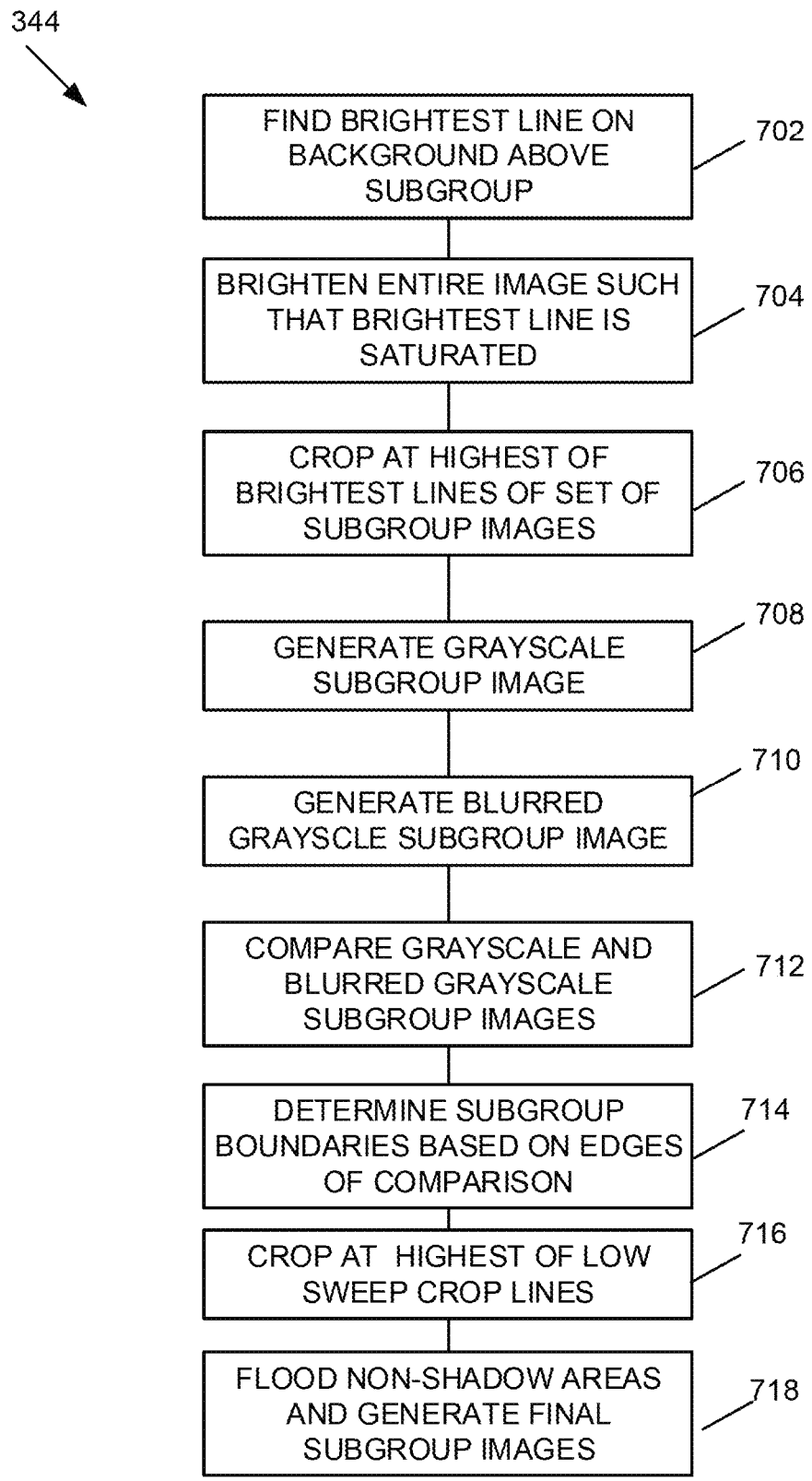
FIG. 10 is a flow chart illustrating an example method of determining subgroup area boundaries.

FIGS. 8-10 illustrate the pre-processed subgroup images 272 at various stages of a method 344 for determining subgroup area boundaries 520, such as method 344 illustrated in FIG. 10. The method 344 illustrated in FIG. 10 is an example of operation 344 of method 300 for generating a composite group image 114, and can be performed by a boundary determinator 244.

FIG. 8 illustrates an example of pre-processed subgroup images 272 in relation to determining the top crop height 502 for cropping pre-processed subgroup images 272. FIG. 8 includes pre-processed subgroup images 272, including a pre-processed subgroup image 272A of a subgroup 12A and a pre-processed subgroup image 272B of a subgroup 12B, and both a top crop height 502 and a bottom crop height 504 overlaid with the pre-processed subgroup images 272. The example shown in FIG. 9 also illustrates a background area 556, a sweep area 558, and a foreground area 560 in both of the pre-processed subgroup images 272A and 272B. The example shown in FIG. 9 further illustrates the brightest background area 506A, the brightest line 508A, and the bottom subgroup area boundary 510A in the pre-processed subgroup image 272A, as well as the brightest background area 506B, the brightest line 508B, and the bottom subgroup area boundary 510B in the pre-processed subgroup image 272B.

FIG. 9 illustrates an example of pre-processed subgroup images 272 at various stages of determining subgroup area boundaries 520 and determining the bottom crop height 504. FIG. 9 includes a subgroup area outline image 572B, the corresponding pre-processed subgroup image 272B from which the subgroup area outline image 572B is derived, and a final subgroup image 610B. FIG. 9 also shows a subgroup area boundary 520B, a bottom subgroup area boundary 510B, and a bottom crop height 504. FIG. 9 further shows a left shadow boundary 512B, a right shadow boundary 514B, a top shadow boundary 516B, and a shadow area 562B. FIG. 9 also shows a top crop height 502, the background area 556, the sweep area 558, and the foreground area 560.

FIG. 10 is a flow chart illustrating an example method 344 of determining subgroup area boundaries 520. In this example, the method 344 includes operations 702, 704, 706, 708, 710, 712, 714, 716, and 718.

The operation 702 finds the brightest lines 508 on the background 156 above the subgroups 12 in the pre-processed subgroup images 272. Referring to the example shown in FIG. 8, the brightest lines 508 are illustrated and the brightest lines 508A and 508B in pre-processed subgroup images 272A and 272B, respectively. Finding the brightest lines 508 includes determining the pixel row heights of the pre-processed subgroup images 272 that corresponds to the locations of the brightest lines 508. In some embodiments, the brightest lines 508 do not need to be lines spanning the entire widths of the pre-processed subgroup images 272. In some embodiments, the brightest lines 508 can be based on background areas 556 above the subgroups 12 that are determined to be the brightest in each of the pre-processed subgroup images 272. For example, the brightest line 508A can be determined based on the brightest background area 506A on the background 556 above the subgroup 12A in the pre-processed subgroup image 272A. In some embodiments, the brightest background areas 506 can be based on a single pixel in each of the pre-processed subgroup images 272. In other embodiments, the brightest background areas 506 can be several pixels, or many pixels arranged in any desired shape, in each of the pre-processed subgroup images 272. The brightest lines 508 can be based on the brightest pixel within the brightest background areas 506, or can be based on a centroid of the brightest background areas 506, or can be based on any other method to determine the brightest lines 508.

The operation 704 brightens each of the pre-processed subgroup images 272 based on the brightness of the brightest line. The brightness values of the brightest lines 508 can be determined based on the brightest pixel in the row corresponding to the brightest lines 508, or can be determined based on brightest background areas 506 that can be used to determine the brightest lines 508, or by any other method. For each of the pre-processed subgroup images 272, if the brightness value of the corresponding brightest line 508 is not saturated, for example having values of (255, 255, 255) for the red, green, and blue channels of an sRGB image, the brightness of the entire pre-processed subgroup image 272 is increased until the brightness value of the brightest line 508 is saturated, or at least substantially saturated. Increasing the brightness of the pre-processed subgroup images 272 is done on an image-by-image basis. For example, if the brightest line 508A of the pre-processed subgroup image 272A is determined to be (240, 240, 240) and the brightest line 508B of the pre-processed subgroup image 272B is determined to be (235, 235, 235), the pre-processed subgroup image 272A is brightened by (15, 15, 15) and the pre-processed subgroup image 272B is brightened by (20, 20, 20) in operation 704. In some embodiments, operation 704 is option and need not be performed as part of the method 344, for example, if the brightest lines 508 are all already saturated.

The operation 706 crops the pre-processed subgroup images 272 at a determined top crop height 502. The top crop height 502 is the single pixel row height determined by the highest of the set of brightest lines 508 of the set of pre-processed subgroup images 272 used to generate the composite group image 114. For example, FIG. 8 illustrates that the pixel row height of the brightest line 508A is the highest of the set of the brightest lines 508, which in this example includes the brightest lines 508A and 508B. In the example shown, the top crop height 502 is then set to the pixel row height of the brightest line 508A. The top crop height 502 is crop height for the entire set of pre-processed subgroup images 272, e.g. pre-processed subgroup images 272A and 272B in the example shown. At operation 706, the entire set of pre-processed subgroup images 272 is cropped at the top crop height 502. Cropping includes discarding pixels that are above the top crop height 502.

The operation 708 generates a corresponding set of grayscale images of the pre-processed subgroup images 272. The grayscale images are generated on an image-by-image basis, for example, the grayscale version of the pre-processed subgroup image 272A is based only on the pre-processed subgroup image 272A, and the grayscale version of the pre-processed subgroup image 272B is based only on the pre-processed subgroup image 272B. Generating a grayscale version of a pre-processed subgroup image 272 can include converting the multi-channel digital format, e.g. sRGB, of the pre-processed subgroup image 272 to a single channel digital formal. Converting from a multi-channel to a single channel format can include discarding channels, averaging channels, scaling and weighting channels, or any other appropriate method. In preferred embodiments, conversion from a multi-channel to a single channel digital format preserves the frequency and brightness, e.g. luminance, content of the image converted.

The operation 710 generates a corresponding set of blurred images of the grayscale versions of the pre-processed subgroup images 272. The blurred images are generated on an image-by-image basis, similar to operation 708 above.

The operation 712 compares the grayscale and blurred grayscale versions of the pre-processed subgroup images 272. Comparison can include subtracting one of the versions from the other version, thereby generating a set of compared grayscale images corresponding to the set of pre-processed subgroup images 272.

The operation 714 determines the subgroup area boundaries 520 based on a determination of the edges of the group areas of the pre-processed subgroup images 272 based on the set of compared grayscale images. Determining the edges of the group areas can include image processing techniques, for example, edge finding algorithms, low-pass or high-pass filtering, or the like. Determining the subgroup area boundaries 520 can include adding a buffer distance to the determined edges of the subgroup areas in a direction outward from the center of the subgroup area and normal to the direction of the determined edge at each point of the determined edges. FIG. 9 illustrates a subgroup area boundary 520B within a subgroup area outline image 572B corresponding to the pre-processed subgroup image 272B. The subgroup area boundaries 520 can be stored in memory, for example, in data store 129 as part of group compositing data 264.

The operation 716 crops the pre-processed subgroup images 272 at a bottom crop height 504. The bottom crop height 504 is the single pixel row height based on the lowest of the set of bottom subgroup area boundaries 510 of the set of pre-processed subgroup images 272 used to generate the composite group image 114. The bottom subgroup area boundaries 510 can be determined based on the lowest pixel height of the subgroup area boundaries 520. In some embodiments, a buffer shift can be subtracted from the pixel row height of the lowest of the set of bottom subgroup area boundaries 510 to determine the pixel row height of the bottom crop height 504. For example, FIG. 9 illustrates that the pixel row height of the bottom subgroup area boundary 510B corresponds to the lowest pixel row height of the subgroup area boundary 520B. In the examples shown in in FIG. 9, the bottom subgroup area boundary 510B is the lowest of the set of bottom subgroup area boundaries 510, and a buffer shift is subtracted from the bottom subgroup area boundary 510B to arrive at the pixel row height of the bottom crop height 504 which is shown in FIG. 9 as being lower than the bottom subgroup area boundary 510B. The buffer shift can be chosen such that the bottom crop height 504 does not extend below the sweep area 558 and into the foreground area of any of the individual images of the set of pre-processed subgroup images 272. The entire set of pre-processed subgroup images 272 is cropped at the bottom crop height 504 at the operation 716. Cropping includes discarding pixels that are below the bottom crop height 504.

The operation 718 floods the background 156 and sweep areas 158 of the bottom and top cropped pre-processed subgroup images 272, excluding the shadow areas 562. In some embodiments, the lighting of the background 156 creates shadows of the subgroups 12 in the sweep areas 558 and the foreground areas 560 in the set of pre-processed subgroup images 272 (and are also present in set of subgroup images 110 before pre-processing).

In some embodiments, the shadows are to be preserved during generation of the composite group image 114 to achieve a desired, or appealing look. Therefore, in some embodiments, shadow areas 562 can be defined within the pre-processed subgroup images 272 in order to avoid flooding those areas and to preserve the shadows. For example, the left shadow boundaries 512 and the right shadow boundaries 514 can be determined based on the subgroup area boundaries 520. A buffer shift can be added to move the left shadow boundaries 512 to the left of the left-most pixel location of the subgroup area boundaries 520, and a buffer shift can be added to move the right shadow boundaries 514 to the right of the right-most pixel location of the subgroup area boundaries 520. Top shadow boundaries 516 can be determined based on the bottom subgroup area boundaries 510, for example, by setting the pixel row heights of the top shadow boundaries 516 to be shifted higher than the pixel row heights of the corresponding pixel row heights of the bottom subgroup area boundaries 510. In the example shown with respect to the subgroup area outline image 572B in FIG. 9, the left shadow boundary 512B is shown shifted to the left of the subgroup area boundary 520B, the right shadow boundary 514B is shown shifted to the right of the subgroup area boundary 520B, and the top shadow boundary 516B is shown shifted above the bottom subgroup area boundary 510B. In the example shown in FIG. 9 in each of the subgroup area outline image 572B, the pre-processed subgroup image 272B, and the final subgroup image 610B, the shadow area 562B is bounded by the left shadow boundary 512B, the right shadow boundary 514B, the top shadow boundary 516B, and the bottom crop height 504.

Flooding includes increasing the brightness of a set of pixels in an image towards maximum brightness, e.g. digital "pure white." For example, for an 8-bit sRGB image, maximum brightness is a value of 255 in each of the channels, or (255, 255, 255). In some embodiments, flooding increases the brightness of pixels outward from the subgroup area boundaries 520 as a function of distance from the subgroup area boundaries 520, and reaching maximum brightness after a certain distance. For example, given four pixels arranged side-by-side, each with values of (215, 230, 225), flooding over a three-pixel distance from a first pixel P1 to the fourth pixel P4 would change the pixel values to: P1(210, 235, 220); P2(225, 250, 235); P3(240, 255, 250); P4(255, 255, 255). In this example, the brightness levels of pixels P2-P4 are increased by (15, 15, 15) for each pixel step in distance from P1-P4. In some embodiments, flooding increases the brightness of pixels by increasing the values of the channels equally, and in other embodiments flooding increases the brightness of pixels by increasing the values of the channels by differing amounts.

FIG. 9 illustrates an example of flooding in final subgroup image 610B. In the example shown, the pixels outside of the subgroup area boundary 520B increase to maximum brightness within a short distance from the subgroup area boundary 520B, except for the shadow area 562B. In the example shown, the flooding operation removes non-uniformities in the background areas, as exemplified by the removal of the dark areas in the upper left and upper right corners of the pre-processed subgroup image 272B in the resulting final subgroup image 610B (those dark corners resulted from portions of the umbrellas of the photography station lights being within the field of view of the image 110B when it was captured).

Figure 11:
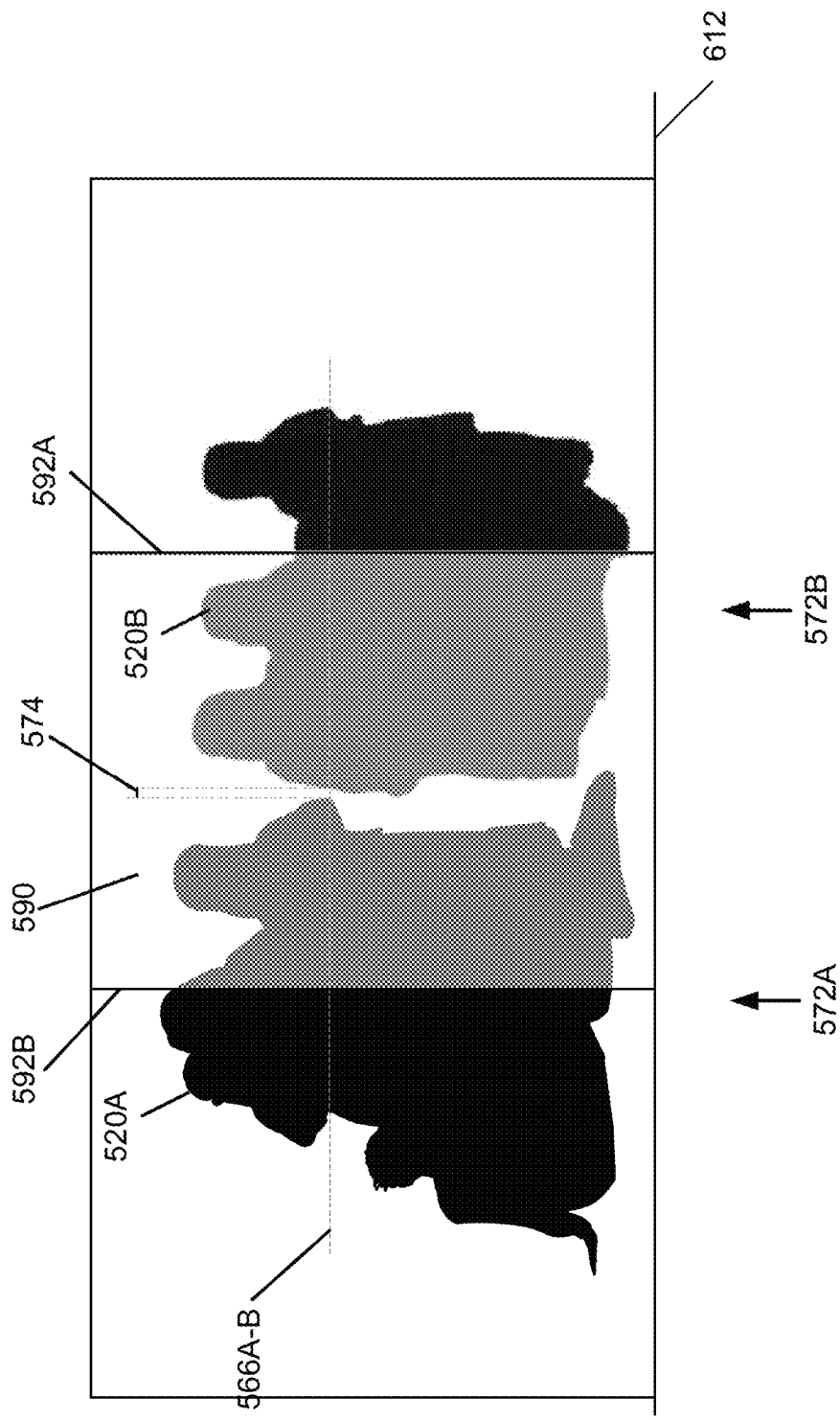
FIG. 11 illustrates an example arrangement of final subgroup images based on shift factors.
Figure 12:
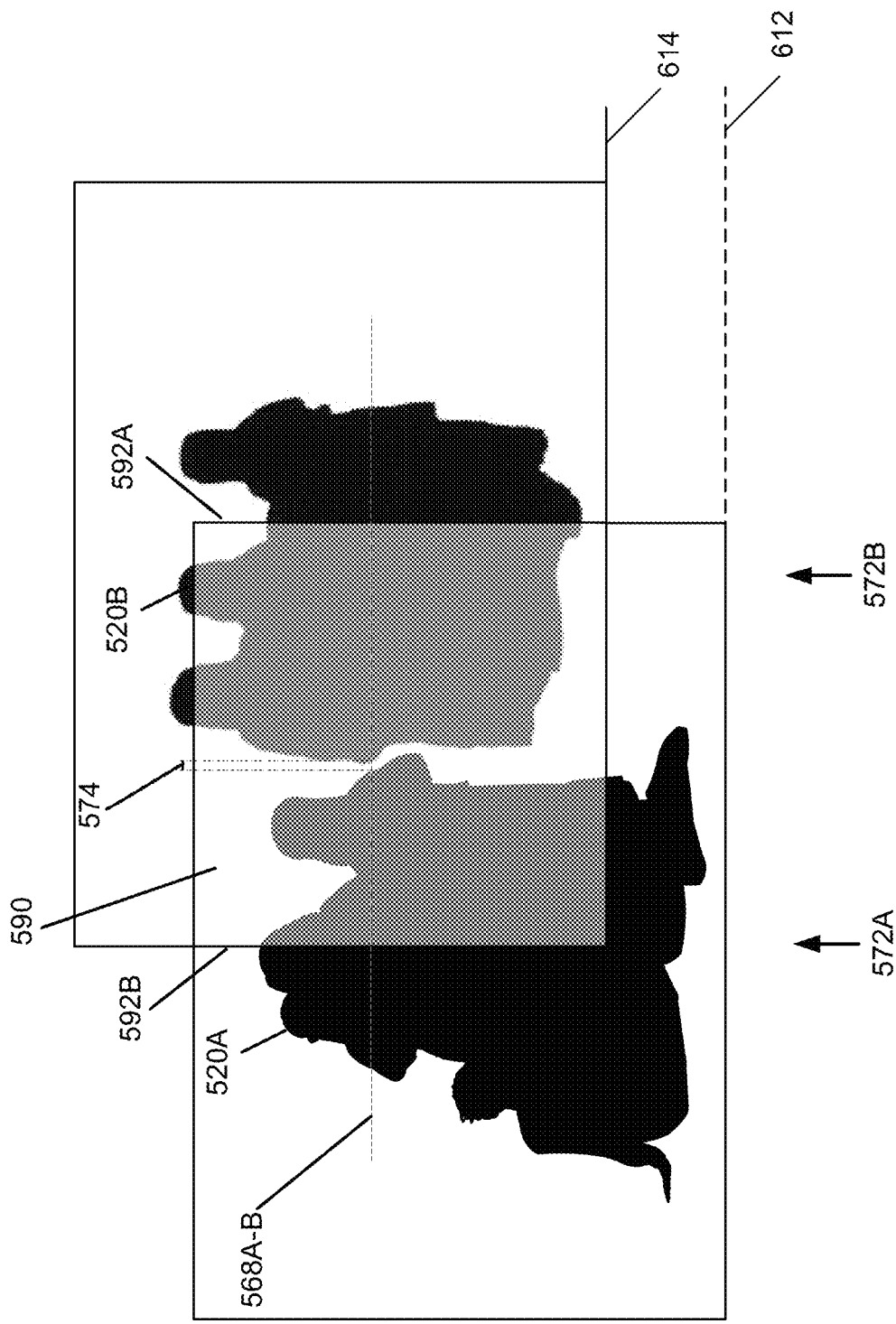
FIG. 12 illustrates another example arrangement of final subgroup images based on shift factors.
Figure 13:
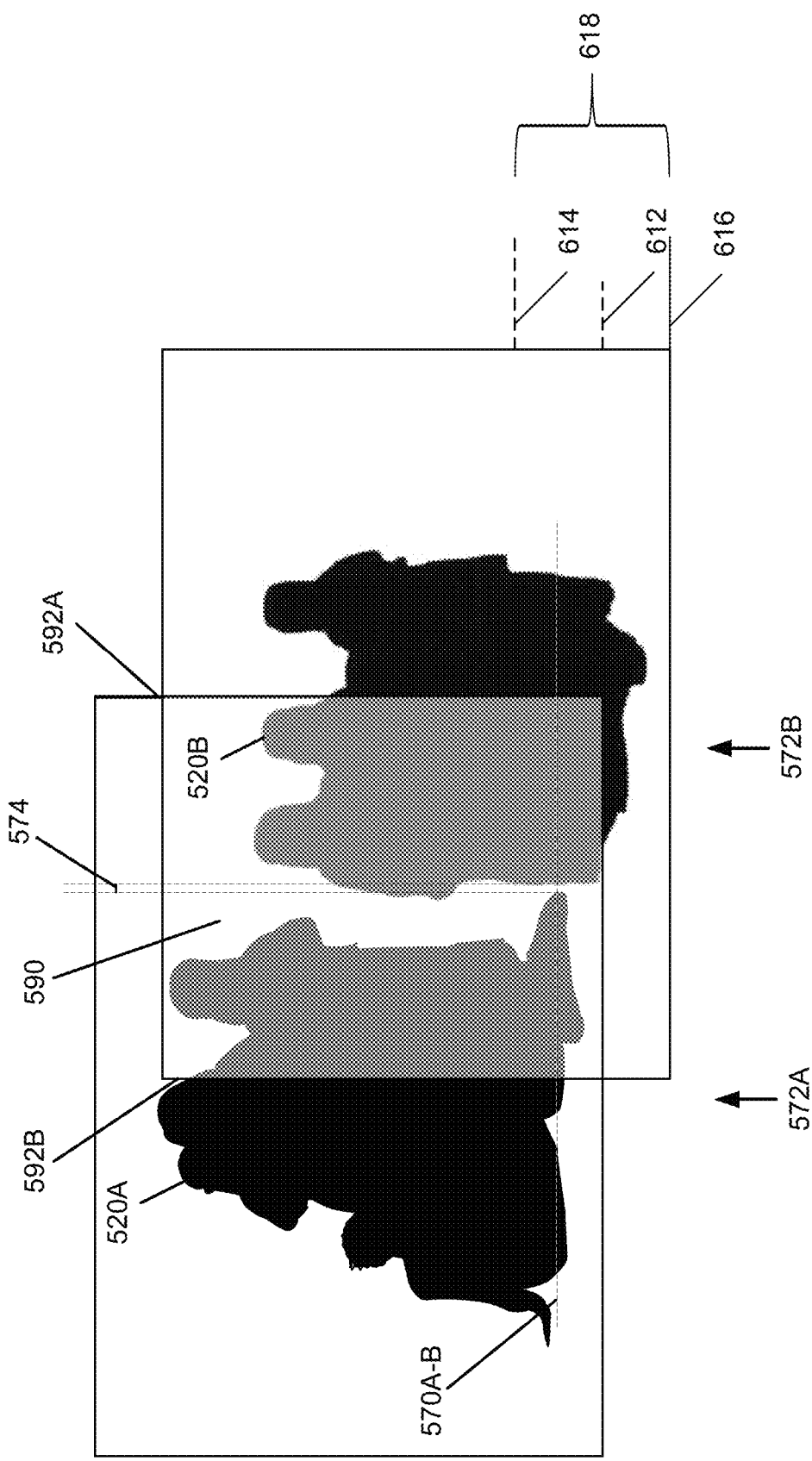
FIG. 13 illustrates another example arrangement of final subgroup images based on shift factors.

FIGS. 11-13 illustrates an example arrangement of final subgroup images 610 based on shift factors. Determination of the shift factors are further described in more detail herein in reference to FIG. 14.

FIG. 11 illustrates an example arrangement of final subgroup images 610 with having their bottom edges vertically aligned. FIG. 11 includes subgroup area outline images 572, including subgroup area outline images 572A and 572B, subgroup area boundary 520A and 520B, a minimum boundary separation row 566A-B, and a minimum boundary separation distance 574. FIG. 11 also shows an alignment line 612, left subgroup area outline image boundary 592B corresponding to subgroup area outline image 572B, right subgroup area outline image boundary 592A corresponding to subgroup area outline image 572A, and overlap area 590.

In some embodiments, by virtue of top and bottom cropping at the operations 706 and 716 in the method 344, all of the images comprising the set of final subgroup images have the same vertical size, and the vertical alignment of the final subgroup images 610 will likely be optimal when the top and bottom edges of the final subgroup images 610 are aligned. In other embodiments, the final subgroup images can have different sizes, and a determination of shift factors includes determining vertical shifts of the final subgroup images 610 in addition to horizontal shifts of the final subgroup images 610.

In some embodiments, the image shift factors for the set of final subgroup images 610 can be determined by the row at which the distance between the subgroup area boundaries 520 of those images are a minimum, when the images are horizontally arranged. In the example shown in FIG. 11, the subgroup area outline image 572A, corresponding to the final subgroup image 610A and the subgroup area boundary 520A is arranged on the left. The subgroup area outline image 572B, corresponding to the final subgroup image 610B and the subgroup area boundary 520B is arranged horizontally to the right of the subgroup area outline image 572A. The example in FIG. 11 also shows the minimum boundary separation row 566A-B, which designates the row at which the separation distance between the subgroup area boundaries 520A and 520B in that single row are at a minimum when final subgroup images 610A and 610B are horizontally arranged, and as compared to the separation distance between the subgroup area boundaries 520A and 520B in all of the other rows of the final subgroup images 610A and 610B. Stated another way, in the example shown, if the final subgroup image 610B that is arranged to the right of final subgroup image 610A were to be shifted horizontally to the left, the minimum boundary separation row 566A-B would be the row at which the subgroup area boundary 520A and 520B would first overlap.

In the example shown in FIG. 11, the subgroup area outline images 572A and 572B are shown as being arranged such that their corresponding subgroup area boundary 520A and 520B are separated by the minimum boundary separation distance 574. The minimum boundary separation distance can be a pre-determined distance chosen such that the final composite group image 114 satisfies an aesthetic criterion, for example, an artistic, authentic, or aesthetically appealing look.

In other embodiments, the image shift factors for the set of final subgroup images 610 can be determined based on the average gap distance between the subgroup area boundaries 520 of those images, when the images are horizontally arranged such that the minimum separation between the subgroup area boundaries 520 of those images is set to the minimum boundary separation distance 574. In some embodiments, the top row and the bottom row used for calculation of the average gap distance can be pre-determined, and in other embodiments the top row and the bottom row used for calculation of the average gap distance can be determined based on the top and bottom vertical boundary locations for each of the subgroup area boundaries 520 corresponding to the images. In some embodiments, offsets from the top and bottom vertical boundary locations for each of the subgroup area boundaries 520 corresponding to the images can be used to determine the top and bottom rows used for calculation of the average gap distance. In other embodiments, the image shift factors can be determined based on the gap area between the subgroup area boundaries 520.

FIGS. 12-13 together illustrate a vertical offset range of final subgroup images 610 that can be used in determining the shift factors for arranging the final subgroup images to form the composite group image 114.

FIG. 12 includes subgroup area outline images 572, including subgroup area outline images 572A and 572B, subgroup area boundaries 520A and 520B, and an upper limit vertical offset line 614. FIG. 12 illustrates the subgroup area outline image 572B vertically shifted to an upper limit vertical offset relative to the subgroup area outline image 572A, while the subgroup area outline image 572A remains in the same position as illustrated in FIG. 11. Similar to FIG. 11 above, FIG. 12 shows a minimum boundary separation row 568A-B, which designates the row at which the separation distance between the subgroup area boundaries 520A and 520B is at a minimum for the upper limit vertical offset illustrated in this example. In some embodiments, a different row can have the minimum separation distance between the subgroup boundaries for different vertical offsets between the images, and thereby be designated the minimum boundary separation row. FIG. 12 also shows the alignment line 612 of FIG. 11, the left subgroup area outline image boundary 592B corresponding to subgroup area outline image 572B, the right subgroup area outline image boundary 592A corresponding to subgroup area outline image 572A, and overlap area 590. In the example shown in FIG. 12, the vertical shift of the subgroup area outline image 572B relative to the subgroup area outline image 572A allows the subgroup area outline images 572A and 572B to be horizontally shifted towards each other, and give the appearance of the subgroup area boundaries 520A and 520B fitting together like "puzzle pieces." In some embodiments, the appearance of the subgroup area boundaries 520A and 520B, such as in the example shown, can be aesthetically pleasing and satisfy an aesthetic criterion.

FIG. 13 includes subgroup area outline images 572, including subgroup area outline images 572A and 572B, subgroup area boundaries 520A and 520B, a lower limit vertical offset line 616, and vertical offset range 618. FIG. 13 illustrates the subgroup area outline image 572B vertically shifted to a lower limit vertical offset relative to the subgroup area outline image 572A, while the subgroup area outline image 572A remains in the same position as illustrated in FIG. 11. In the example shown, the subgroup area outline image 572B is also horizontally shifted to the right relative to the subgroup area outline image 572A such that the subgroup area boundaries 520A and 520B maintain the minimum boundary separation distance 574 and do not overlap. Similar to FIGS. 11-12 above, FIG. 13 shows a minimum boundary separation row 570A-B, which designates the row at which the separation distance between the subgroup area boundaries 520A and 520B is at a minimum for the lower limit vertical offset illustrated in this example. FIG. 13 also shows the upper limit vertical offset line 614 of FIG. 12 and the alignment line 612 of FIG. 11. FIG. 13 also shows the left subgroup area outline image boundary 592B corresponding to subgroup area outline image 572B, the right subgroup area outline image boundary 592A corresponding to subgroup area outline image 572A, and overlap area 590.

In some embodiments, determining shift factors includes determining both horizontal and vertical shift factors over a range of vertical offsets between the final subgroup images 610. In some embodiments, the range of vertical offsets can be determined by a user, or can be determined automatically by the composite generator. In some embodiments, the range of vertical offsets can be set in terms of pixels, e.g. a 10 pixel range, or a 50 pixel range, or a 100 pixel range, or more or fewer pixels in the range. In other embodiments, the range of vertical offsets can be set in terms of a percentage of the vertical heights of the final subgroup images 610, or can be set based on other factors.

The examples shown in FIGS. 12-13 illustrate an example vertical offset range 618, with FIG. 12 illustrating the subgroup area outline image 572B shifted to an upper limit vertical offset relative to the subgroup area outline image 572A, and FIG. 13 illustrating the subgroup area outline image 572B shifted to a lower limit vertical offset relative to the subgroup area outline image 572A.

Figure 14:
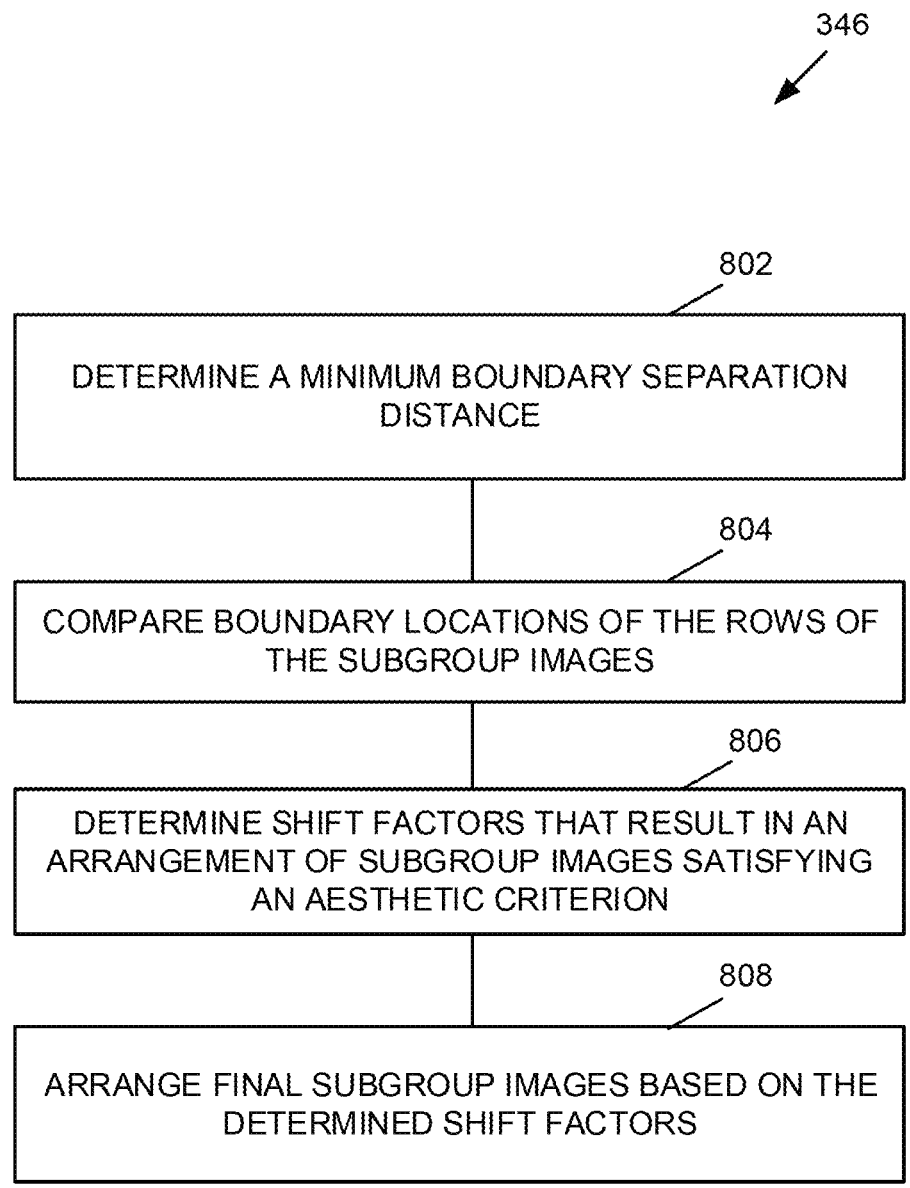
FIG. 14 is a flow chart illustrating an example method of determining shift factors.

FIG. 14 is a flow chart illustrating an example method 346 of determining shift factors. In this example, the method 346 includes operations 802, 804, 806, and 808. The method 346 can be performed as part of operation 346 of method 300 for generating a composite group image 114, and can be performed by an image shifter 246.

The operation 802 determines a minimum boundary separation distance 574. The minimum boundary separation distance 574 can be pre-determined, or determined by machine learning, or by any other method. The minimum boundary separation distance 574 is determined based on the final composite group image 114 satisfying an aesthetic criterion, such as an artistic, authentic, or aesthetically appealing look, or other desired features.

The operation 804 compares the boundary locations of the rows of the final subgroup images 610. The comparison in operation 804 is done on both and image-by-image, and a row-by-row basis. For example, the set of final subgroup images 610 can be arranged side-by-side horizontally and vertically aligned such that a final subgroup image 610A can be located to the left of a final subgroup image 610B, with the bottom edges of each of the final subgroup images 610A and 610B vertically aligned along a horizontal line. An illustration of such an example alignment is shown in FIG. 11. In FIG. 11, the subgroup area outline images 572A and 572B represent the final subgroup images 610A and 610B, and are arranged side-by-side horizontally and with their bottom edges aligned along a horizontal line corresponding with alignment line 612. In such an arrangement, the separation distance between the subgroup area boundary 520A and 520B along each row from the bottom to the top of the final subgroup images 610A and 610B, can be determined. Similarly, the separation distance between the subgroup area boundary 520B and 520C along each row from the bottom to the top of the final subgroup images 610B and 610C, can be determined. All of the determined separation distances can be compared at operation 804 for a set of final subgroup images 610, and the rows at which the minimum separation distance between the subgroup area boundaries 520 occur can be determined, along with the magnitude of the separation distances at those rows. In some embodiments, the comparison of the boundary locations of the rows of the final subgroup images 610 can be done for any ordering of the final subgroup images 610, e.g. final subgroup image 610A arranged to the right of final subgroup image 610B as well as vice versa, or final subgroup image 610A arranged to the right of final subgroup image 610C as well as vice versa.

The operation 806 determines shift factors that result in the final subgroup images 610 being arranged horizontally separated by the minimum boundary separation distance 574. In the example shown FIG. 11, the operation 806 determines shift factors such that the final subgroup images 610A and 610B, when arranged horizontally side-by-side and vertically aligned, result in the minimum boundary separation distance between the subgroup area boundary 520A and 520B being equal to the minimum boundary separation distance 574. The minimum boundary separation distance 574 can be the same between all of the final subgroup images 610, or the minimum boundary separation distance 574 can be a set of minimum boundary separation distances 574 that varies between some or all of the set of final subgroup images 610.

In some embodiments, determining the shift factors includes determining the boundary locations as described above in reference to operation 806 and FIG. 11 for every vertical offset of the final subgroup images 610 for the vertical offset range 618, e.g. every vertical offset bounded by the upper limit vertical offset line 614 illustrated in FIG. 12 and the lower limit vertical offset line 616 illustrated in FIG. 13. For example, the minimum boundary separation row for every vertical offset within the vertical offset range 618, and the shift factors required to set the boundary distances to the minimum boundary separation distance 574 for each of the minimum boundary separation rows, can be determined. In some embodiments, the shift factors are determined based on the shifts required to arrange the final subgroup images 610 to the minimum boundary separation distance 574 at a vertical offset within the vertical offset range that results in the arrangement satisfying the aesthetic criterion. In some embodiments, the average boundary gap between the final subgroup images 610 at each vertical offset within the vertical offset range 618 can be determined, and the shift factors can be based on the average gap distances at different offsets.

The operation 808 arranges the final subgroup images 610 based on the determined horizontal shift factors. The operation 808 results in the set of final subgroup images 610 being arranged horizontally side-by-side, vertically aligned, and with a minimum boundary separation distance 574, or minimum boundary separation distances 574, between the respective subgroup area boundaries 520. In some embodiments, this arrangement results in significant overlap of the final subgroup images 610, illustrated in FIG. 11 as overlap area 590. The operation 808 also results in the final arrangement of the subgroups 12 within the composite group image 114.

Figure 15:
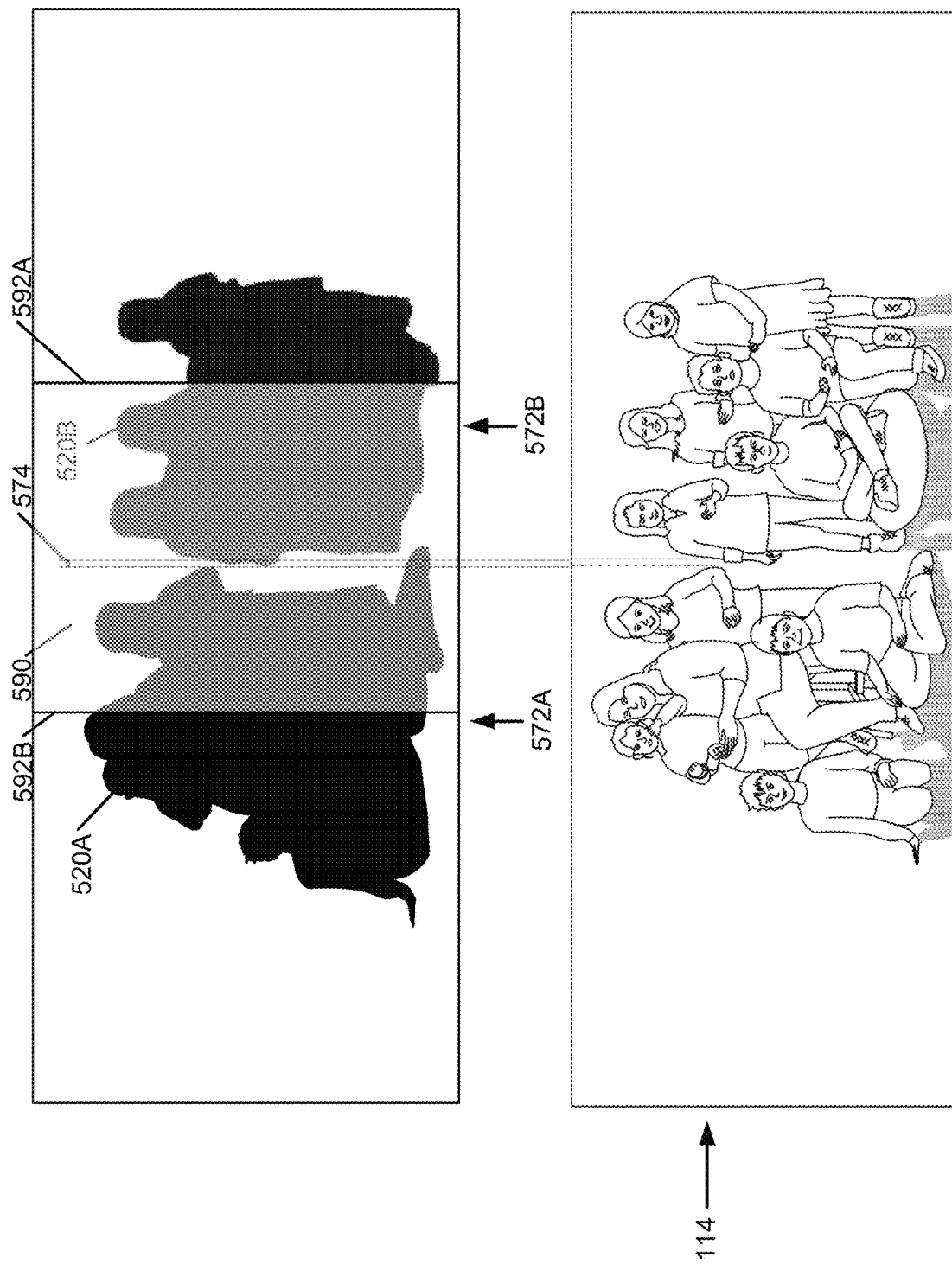
FIG. 15 illustrates an example arrangement of final subgroup images and the corresponding composite group image.

FIG. 15 illustrates an example arrangement of final subgroup images 610 and the corresponding composite group image 114. FIG. 15 includes subgroup area outline images 572A and 572B, as proxies for their corresponding final subgroup images 610A and 610B for illustrative clarity, in their final arrangement after operation 808, and the composite group image 114 generated from final subgroup images 610A and 610B. FIG. 15 also shows subgroup area boundary 520A and 520B, the overlap area 590, and the minimum boundary separation distance 574. FIG. 15 shows the arranged subgroup area outline images 572A and 572B above and horizontally aligned with composite group image 114, illustrating the minimum boundary separation distance 574 both before (on the top with respect to the subgroup area outline images 572A and 572B) and after (below with respect to the composite group image 114) performing a method 348 for blending arranged final subgroup images 610.

Figure 16:
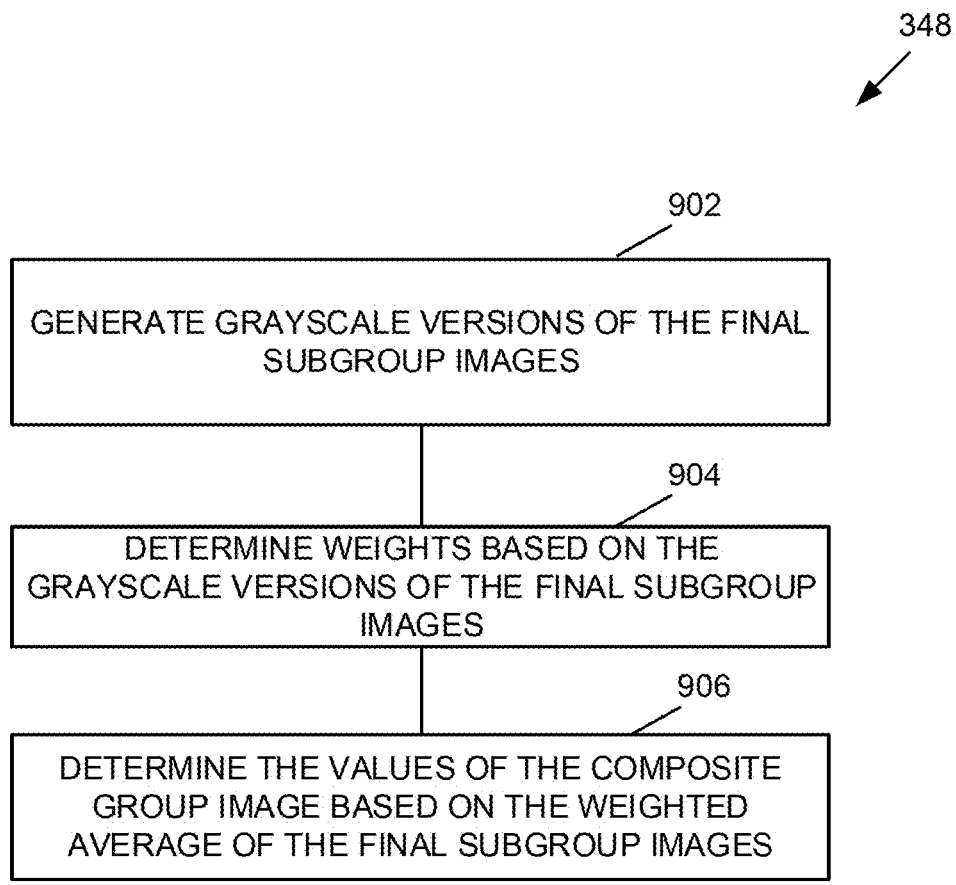
FIG. 16 is a flow chart illustrating an example method of blending arranged final subgroup images to form a composite group image.

FIG. 16 is a flow chart illustrating an example method 348 of blending arranged final subgroup images 610 to form a composite group image 114. In this example, the method 348 includes operations 902, 904, and 906. The method 348 is an example of operation 348 of method 300 for generating a composite group image 114, and can be performed by an image blender 248.

The operation 902 generates grayscale versions of the final subgroup images 610. Generating grayscale versions can include converting the multi-channel digital format, e.g. sRGB, of the images to a single channel digital formal, as described above in connection with operation 708. Converting from a multi-channel to a single channel format can include discarding channels, averaging channels, scaling and weighting channels, or any other appropriate method. In preferred embodiments, conversion from a multi-channel to a single channel digital format preserves the frequency and brightness, e.g. luminance, content of the image converted.

The operation 904 determines weights based on the grayscale versions of the final subgroup images 610. The weights can be determined for each pixel location of the final subgroup images 610 as arranged following operation 808. In some embodiments, the arrangement following operation 808 will be larger horizontally than any single image in the set of final subgroup images 610 because they will be arranged horizontally and overlapping. In areas of overlap, there will be more than one pixel value at a particular pixel location due to the overlap. For example, as illustrated in FIG. 15, there will be two values for each pixel location in the overlap area 590 corresponding to a pixel from each of the final subgroup images 610A and 610B.

The weights can be determined based on the grayscale values of the grayscale versions of the final subgroup images 610 corresponding to each pixel location, and using the following equation:

$$W1=(256-G1)/(512-G1-G2)$$

$$W2=(256-G2)/(512-G1-G2) \quad \text{Equation 1:}$$

where W1 and W2 are weights for a particular pixel location, G1 is the grayscale value of the grayscale version of the final subgroup image 610A at the same pixel location, and G2 is the grayscale value of the grayscale version of the final subgroup image 610B at the same pixel location. Equation 1 can be used to determine the weights W1 and W2 for every pixel location of the final subgroup images 610A and 610B as arranged in operation 808, and as corresponds to every pixel location in the final composite group image 114. In areas where final subgroup images 610 do not overlap, Equation 1 will still work to arrive at the pixel value of the final composite group image 114. For example, in the areas to the left of the overlap area 590, G2 will be zero for every pixel in that region, and in the areas to the right of the overlap area 590, G1 will be zero for every pixel in that region.

The operation 906 determines the values of the composite group image 114 based on the weighted average of the final subgroup images 610 as arranged after operation 808. The values for the composite group image 114 can be determined using the following equation:

$$CR=W1*G1R+W2*G2R$$

$$CG=W1*G1G+W2*G2G$$

$$CB=W1*G1B+W2*G2B \quad \text{Equation 2:}$$

where CR, CG, and CB are the red, green, and blue channel values for the composite group image 114 at a particular pixel, G1R, G1G, and G1B are the red, green, and blue channel values for the final subgroup images 610A as arranged after operation 808 for the same pixel, and G2R, G2G, and G2B are the red, green, and blue channel values for the final subgroup images 610B as arranged after operation 808 for the same pixel.

As illustrated in FIG. 15, the result of the method 300 is a composite group image 114 that arranges subgroups 12 next to each other by an artistic, authentic, or aesthetically appealing distance, and preserves the shadows of the captured subgroup images 110. The composite group image 114 generated as a result of performing the method 300, and as executed, by example, by a composite generator 104, includes a clean, saturated white background which can be kept as is, or which can include logos, graphics, icons, and the like.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of generating a composite group image from subgroup images, the method comprising:
   accessing the subgroup images, each of the subgroup images having a common background;
   determining boundaries of a subgroup area within each of the subgroup images;
   determining at least one horizontal shift factor and at least one vertical shift factor using the determined boundaries;
   determining a gap distance between the determined boundaries of the subgroup areas of the subgroup images using the at least one horizontal shift factor and the at least one vertical shift factor;
   generating an arrangement for the subgroup images based on the at least one horizontal shift factor, the at least one vertical shift factor, and the gap distance; and
   generating the composite group image by blending the subgroup images arranged in the arrangement.

2. The method of claim 1, wherein accessing the subgroup images further comprises:
   arranging a subgroup image capture station with a common background and background lighting;
   capturing subgroup images using a camera positioned to take images of subgroups within the image capture station;
   loading the subgroup images into a memory; and
   processing the subgroup images such that each subgroup image is in landscape format with the subgroup upright.

3. The method of claim 1, wherein determining the boundaries of the subgroup area within each of the subgroup images further comprises:
   determining a top crop height, comprising:
     determining a height based on a brightest line of the common background above the subgroup within each of the subgroup images;
     determining a highest of the determined heights; and
     adding a predetermined crop height margin to the highest of the determined heights;
   cropping each of the subgroup images based on the top crop height;
   generating grayscale images of each of the cropped subgroup images;
   blurring the grayscale images;
   generating comparison images based on the grayscale and blurred grayscale images;
   determining the edges of the subgroups based on the comparison images; and
   adding a predetermined margin to the determined edges of the subgroups.

4. The method of claim 3, further comprising normalizing the brightness levels of each of the subgroup images based on the common background by:
   determining the brightness differences between the brightness of brightest lines of each of subgroup images and maximum brightness;
   brightening each of the subgroup images by the determined differences; and
   flooding the common background of each of the subgroup images in the vertical and side directions from the determined boundaries.

5. The method of claim 1, wherein determining the at least one horizontal and the at least one vertical shift factor using the determined boundaries further comprises:

for each of a plurality of vertical offsets:
arranging the subgroup images horizontally at a predetermined minimum separation distance between the determined boundaries of the subgroup areas of the subgroup images; and
determining the average gap distance between the determined boundaries of the subgroup areas of the subgroup images; and
determining the at least one horizontal and the at least one vertical shift factor based on an aesthetic criterion.

6. The method of claim 5, wherein the aesthetic criterion is based on the minimum determined average gap distance.

7. The method of claim 1, wherein generating an arrangement for the subgroup images based on the at least one horizontal shift factor and the at least one vertical shift factor further comprises:
determining a bottom crop height, comprising:
determining a bottom height based on a lowest point of the determined boundaries for each of the subgroup images;
determining a lowest of the determined bottom heights; and
reducing the lowest of the determined bottom heights by a predetermined bottom margin;
cropping each of the plurality of subgroup images based on the bottom crop height; and
shifting each of the subgroup images based on the at least one horizontal shift factor and the at least one vertical shift factor.

8. The method of claim 1, wherein blending the subgroup images arranged in the arrangement comprises adding overlapping pixels of the subgroup images as a weighted sum.

9. The method of claim 1, wherein the subgroup within each of the subgroup images includes one or more subjects.

10. The method of claim 1, further comprising generating a product by printing the composite group image on photographic paper.

11. The method of claim 1, wherein the common background has a uniform background color.

12. The method of claim 11, wherein the background color is white.

13. The method of claim 1, wherein the subgroups within each of the subgroup images comprise a first subgroup and a second subgroup, and wherein the arrangement of the subgroup images results in a portion of a first subgroup being positioned above a portion of a second subgroup.

14. The method of claim 1, wherein the composite group image preserves shadows contained in the subgroup images.

15. At least one computing device comprising:
at least one processing device; and
at least one computer readable storage medium storing data instructions that, when executed by the at least one processing device, cause the at least one processing device to:
access the subgroup images, each of the subgroup images having a common background;
determine boundaries of a subgroup area within each of the subgroup images;
determine at least one horizontal shift factor and at least one vertical shift factor using the determined boundaries;
determine a gap distance between the determined boundaries of the subgroup areas of the subgroup images using the at least one horizontal shift factor and the at least one vertical shift factor;
generate an arrangement for the subgroup images based on the at least one horizontal shift factor, the at least one vertical shift factor, and the gap distance; and
generate the composite group image by blending the subgroup images arranged in the arrangement.

16. The at least one computing device of claim 15, wherein the instructions that cause the at least one processing device to determine the at least one horizontal shift factor and the at least one vertical shift factor using the determined boundaries further cause the at least one processing device to:
for each of a plurality of vertical offsets:
arrange the subgroup images horizontally at a predetermined minimum separation distance between the determined boundaries of the subgroup areas of the subgroup images; and
determine the average gap distance between the determined boundaries of the subgroup areas of the subgroup images; and
determine the at least one horizontal shift factor and the at least one vertical shift factor based on the minimum determined average gap distance.

17. The at least one computing device of claim 15, wherein the instructions that cause the at least one processing device to generate the arrangement for the subgroup images based on the at least one horizontal and at least one vertical shift factor further cause the at least one processing device to:
determining a bottom crop height, comprising:
determining a bottom height based on a lowest point of the determined boundaries for each of the subgroup images;
determining a lowest of the determined bottom heights; and
reducing the lowest of the determined bottom heights by a predetermined bottom margin;
cropping each of the plurality of subgroup images based on the bottom crop height; and
shifting each of the subgroup images based on the determined at least one horizontal and at least one vertical shift factor.

18. The computing device of claim 15, wherein blending the subgroup images arranged in the arrangement comprises adding overlapping pixels of the subgroup images as a weighted sum.

19. The computing device of claim 15, wherein the composite group image preserves shadows contained in the subgroup images.

20. At least one non-transitory computer readable storage medium storing data instructions that, when executed by at least one processing device, cause the at least one processing device to:
access the subgroup images, each of the subgroup images having a common background;
determine boundaries of a subgroup area within each of the subgroup images;
determine at least one shift factor using the determined boundaries;
determine a gap distance between the determined boundaries of the subgroup areas of the subgroup images using the at least one shift factor;
generate an arrangement for the subgroup images based on the at least one shift factor and the gap distance; and
generate the composite group image by blending the subgroup images arranged in the arrangement.

* * * * *